(12) United States Patent
Susaki et al.

(10) Patent No.: US 10,026,272 B2
(45) Date of Patent: Jul. 17, 2018

(54) ACCOUNTING APPARATUS

(71) Applicant: TOSHIBA TEC KABUSHIKI KAISHA, Shinagawa-ku, Tokyo (JP)

(72) Inventors: Akiko Susaki, Ota Tokyo (JP); Tsuyoshi Gotanda, Ota Tokyo (JP); Norifumi Shishido, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/343,588

(22) Filed: Nov. 4, 2016

(65) Prior Publication Data
US 2017/0132882 A1 May 11, 2017

(30) Foreign Application Priority Data
Nov. 5, 2015 (JP) ................. 2015-217887

(51) Int. Cl.
| | |
|---|---|
| *G07G 1/00* | (2006.01) |
| *E05B 47/02* | (2006.01) |
| *E05B 65/06* | (2006.01) |
| *G07G 1/12* | (2006.01) |
| *E05B 47/00* | (2006.01) |
| *G06Q 20/18* | (2012.01) |

(52) U.S. Cl.
CPC .......... *G07G 1/0027* (2013.01); *E05B 47/02* (2013.01); *E05B 65/06* (2013.01); *G07G 1/12* (2013.01); *E05B 2047/0084* (2013.01); *G06Q 20/18* (2013.01)

(58) Field of Classification Search
CPC .............. G07G 1/00; G06F 17/00; G07F 7/04
USPC ................. 235/0.7 A, 7 R, 375; 194/206
See application file for complete search history.

(56) References Cited

U.S. PATENT DOCUMENTS

| | | | | |
|---|---|---|---|---|
| 8,640,945 B1* | 2/2014 | McCormick | ............. | G07D 1/02 235/379 |
| 2007/0178972 A1* | 8/2007 | Moshal | ................... | G07F 17/32 463/43 |

(Continued)

FOREIGN PATENT DOCUMENTS

JP 2013-181377 9/2013

*Primary Examiner* — Edwyn Labaze
(74) *Attorney, Agent, or Firm* — Amin, Turocy & Watson LLP

(57) ABSTRACT

According to one embodiment, an accounting apparatus includes: a case body that accommodates a change machine for dispensing a change and a stocking unit for stocking money to replenish the change machine; a door that is provided at the case body so as to be able to be opened and closed and closes an accommodation unit for accommodating the stocking unit; a first electromagnetic lock that is shifted between a locked state where the door is not able to be opened and an unlocked state where the door is able to be opened; and an opening and closing control section that maintains the first electromagnetic lock in the locked state in a normal mode in which accounting processing of driving the change machine such that the change machine dispenses a change with respect to a price of a sales target is executed, and enables the first electromagnetic lock to be shifted to the unlocked state in a specific mode based on an input of unlocking permission information for the electromagnetic lock.

20 Claims, 27 Drawing Sheets

(56) References Cited

U.S. PATENT DOCUMENTS

| | | | |
|---|---|---|---|
| 2008/0171508 A1* | 7/2008 | Enomoto | G07D 1/00 453/18 |
| 2009/0320106 A1* | 12/2009 | Jones | G06Q 20/1085 726/5 |
| 2014/0110219 A1* | 4/2014 | Higashiyama | G07G 1/12 194/216 |

* cited by examiner

ACCOUNTING APPARATUS

CROSS-REFERENCE TO RELATED APPLICATIONS

This application is based upon and claims the benefit of priority from Japanese Patent Application No. 2015-217887, filed Nov. 5, 2015, the entire contents of which are incorporated herein by reference.

FIELD

Embodiments described herein relate generally to an accounting apparatus and methods associated therewith.

BACKGROUND

In the related art, a self-checkout-type accounting apparatus by which a customer themself executes an operation of registering sales targets, such as merchandise, and an accounting operation was proposed in relation to sales of sales targets such as merchandise. In addition, a semi-self-checkout system provided with a registration apparatus and an accounting apparatus such that an operator executes a registration operation by using the registration apparatus and a customer executes an accounting operation by using the accounting apparatus was proposed. Such an accounting apparatus and the accounting apparatus included in such a checkout system are provided with coin change machines and bill change machines for accounting by cash.

Stocking units for stocking bills and coins (hereinafter, collectively referred to as "money") for replenishing the change machines with change are provided. However, such accounting apparatuses are not provided with the stocking units for security since the customer themselves operate the accounting apparatuses. Therefore, a store worker such as an attendant carries money from a stocking unit installed in a management area, such as backroom, to the accounting apparatuses and replenishes the change machines with money as needed. This requires time and effort from the store worker, and imparts a burden on the store worker and risk of loss on the store owner.

DETAILED DESCRIPTION

An object of the exemplary embodiments is to provide an accounting apparatus that enables the accounting apparatus itself operated by a customer to be provided with a stocking unit while maintaining security.

In general, according to one embodiment, an accounting apparatus includes: a case body that accommodates a change machine for dispensing a change and a stocking unit for stocking money to replenish the change machine; a door that is provided at the case body so as to be able to be opened and closed and closes an accommodation unit for accommodating the stocking unit; a first locking mechanism that is shifted between a locked state where the door is not able to be opened and an unlocked state where the door is able to be opened; and an opening and closing control section that maintains the first locking mechanism in the locked state in a normal mode in which accounting processing of driving the change machine such that the change machine dispenses a change with respect to a price of a sales target is executed, and enables the first locking mechanism to be shifted to the unlocked state in a specific mode based on an input of unlocking permission information for the locking mechanism.

Hereinafter, detailed description will be given of an accounting apparatus according to an embodiment with reference to accompanying drawings from FIGS. 1 to 26. In the embodiment, a self-checkout Point of Sales (POS) terminal by which a customer executes a registration operation and an accounting operation will be described as the accounting apparatus. In the embodiment, a money bar drawer that stocks money bars which are replenished in a coin change machine (each of which is obtained by integrating a predetermined number of (fifty, for example) overlaid same type of coins with a film or the like) will be described as an example of the stocking unit. In the embodiment, merchandise will be described as an example of the sales target. The disclosure is not limited to the embodiments described below.

Figure 1:
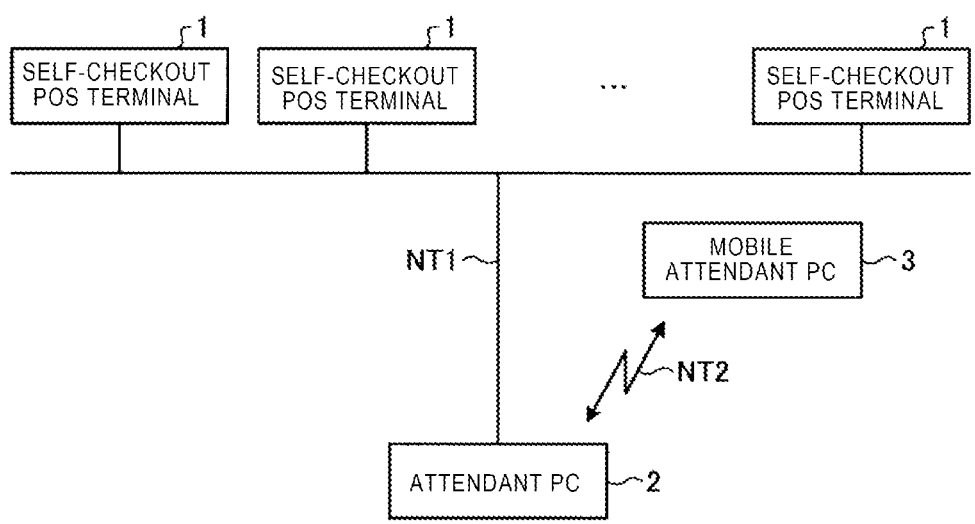
FIG. 1 is a diagram schematically illustrating a system including a self-checkout POS terminal according to an embodiment.

FIG. 1 is a diagram schematically illustrating a system including a self-checkout POS terminal according to the embodiment. As illustrated in FIG. 1, the system is configured to include a plurality of self-checkout POS terminals 1, an attendant Personal Computer (PC) 2, and a mobile attendant PC 3. Each of the self-checkout POS terminal 1 and the attendant PC 2 are electrically connected to each other with a communication line NT1 such as a Local Area Network (LAN) line. The attendant PC 2 and the mobile attendant PC 3 are electrically connected to each other via a communication line NT 2 such as a wireless LAN.

Each self-checkout POS terminal 1 includes a registration unit that reads merchandise codes for specifying merchandise to be purchased and an accounting unit that performs an accounting operation based on merchandise information corresponding to the read merchandise codes. A customer themself performs both the registration operation by using the registration unit and the accounting operation by using the accounting unit. The self-checkout POS terminal 1 executes sales registration processing based on the registration operation performed by the customer. The self-checkout POS terminal 1 executes accounting processing based on the accounting operation performed by the customer. A detailed configuration of the self-checkout POS terminal 1 will be described in detail with reference to FIGS. 2 to 5.

Here, the sales registration processing means processing of displaying and storing merchandise information such as names and prices of the merchandise based on the input merchandise codes. The accounting processing means processing of displaying a total price related to a transaction based on the merchandise information obtained by the sales registration processing, adjusting an account based on deposits received from the customer, and issuing a receipt. Transaction processing includes the sales registration processing and the accounting processing. Transaction information includes the merchandise information and the accounting information.

The self-checkout POS terminal 1 can be shifted between a normal mode and an unlocking mode. The normal mode is a mode in which the customer can perform the registration operation and the accounting operation. The unlocking mode is a mode in which an electromagnetic lock of the self-checkout POS terminal 1 can be unlocked for addressing an error occurring in the self-checkout POS terminal 1 or for replenishment of a receipt sheet or changes. The self-checkout POS terminal 1 can open the inside thereof by unlocking the electromagnetic lock. The self-checkout POS terminal 1 can be shifted to the unlocking mode if a code (an attendant code in the embodiment) as permission information for specifying a person who is authorized to unlock the self-checkout POS terminal 1, such as a manager, a store manager, or a specific attendant, is input.

A camera that monitors a state where the customer performs the registration operation and the accounting operation is provided in the vicinity of each self-checkout POS terminal 1. A display unit 208 (see FIG. 7) of the attendant PC 2 plays a movie of the registration operation and the accounting operation performed by the customer using each self-checkout POS terminal 1. An attendant (who is authorized to unlock the self-checkout POS terminal 1) as a store worker views the movie played on the display unit 208 of the attendant PC 2, monitors the registration operation and the accounting operation performed by the customer, and checks a dishonest act by the customer, for example. The attendant PC 2 displays information about an operation of a help button of the self-checkout POS terminal 1 by the customer, the attendant who views the display goes to the corresponding self-checkout POS terminal 1 and helps the operation, for example.

The mobile attendant PC 3 is a PC that can be carried by the attendant, such as a tablet PC. The mobile attendant PC 3 has a part of functions of the attendant PC. The mobile attendant PC 3 receives the movie of the registration operation and the accounting operation performed by the customer using the self-checkout POS terminal 1 from the attendant PC 2, and plays the movie on a display unit 308 (see FIG. 8). The attendant views the movie played on the display unit 308, monitors the registration operation and the accounting operation performed by the customer, and checks a dishonest act by the customer, for example. Since the attendant carries the mobile attendant PC 3, the attendant can monitor the registration operation and the accounting operation performed by the customer from any place.

Figure 2:
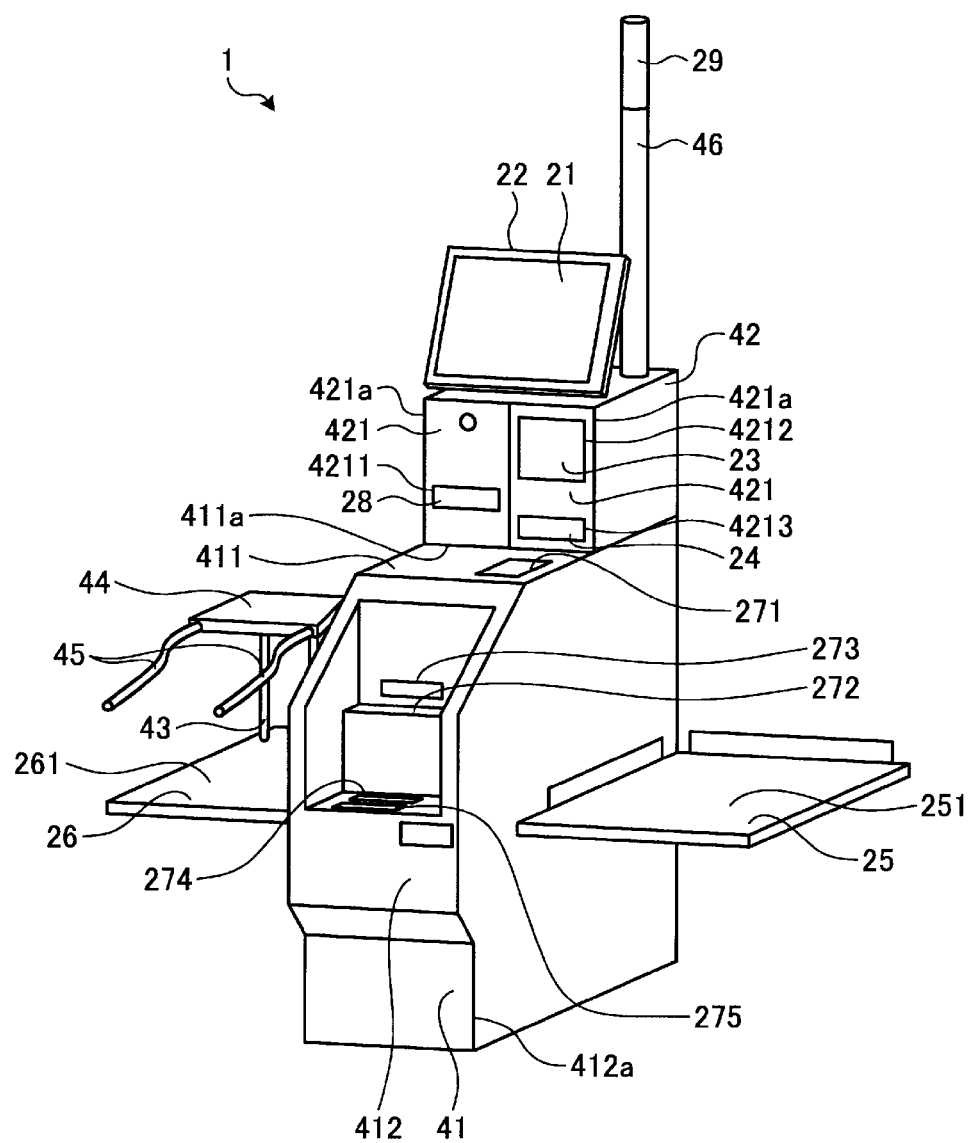
FIG. 2 is a perspective view illustrating an appearance of the self-checkout POS terminal.

FIG. 2 is a perspective view illustrating an appearance of the self-checkout POS terminal 1. As illustrated in FIG. 2, the self-checkout POS terminal 1 includes a first case body 41 and a second case body 42. The first case body 41 accommodates a coin change machine 34 and a bill change machine 35 (collectively referred to as a "change machine 27"), a money bar drawer 33 (stocking unit), and a control device 36 in an accommodation unit 37 (see FIG. 3) therein. The coin change machine 34 accommodates coins received from the customer in accordance with money types. The coin change machine 34 deposits coin changes for the customer. The bill change machine 35 accommodates bills received from the customer in accordance with money types. The bill change machine 35 deposits bill changes for the customer. The money bar drawer 33 stocks money bars of various types of coins. The control device 36 executes processing of controlling the self-checkout POS terminal 1. The control device 36 includes a control unit 100, a memory unit 14, a communication unit 43, a power unit (not illustrated), and the like in FIG. 6.

The first case body 41 includes a first door 411 (door) and a second door 412 (door) that can be opened and closed. The first door 411 is turned about a hinge 411a in the vertical direction. The second door 412 is turned about a hinge 412a in the horizontal direction. The second door 412 is interfered with the first door 411, and the first door 411 is to be opened upward in order to open the second door 412. If both the first door 411 and the second door 412 are in the closed state, it is not possible to open only the second door 412.

The upper half of the inside of the first case body 41 is opened by turning the first door 411 upward, and the coin change machine 34 and the bill change machine 35 are exposed. The lower half of the inside of the first case body 41 is opened by turning the second door 412 in the right direction, and the money bar drawer 33 and the control device 36 are exposed.

The lower half of the inside of the first case body 41 is closed by turning the second door 412 in the left direction, and the money bar drawer 33 and the control device 36 are hidden by the closed second door 412. Thereafter, the upper portion of the first case body 41 is closed by turning the first door 411 in the lower direction, and the coin change machine 34 and the bill change machine 35 are hidden by the first door 411. The self-checkout POS terminal 1 tightly closes the accommodation unit 37 accommodating the coin change machine 34, the bill change machine 35, the money bar drawer 33, and the control device 36 inside the first case body 41 by closing the first door 411 and the second door 412 as described above.

That is, the customer and the attendant cannot touch the coin change machine 34, the bill change machine 35, the money bar drawer 33, and the control device 36 located inside the first case body 41 from the outside of the self-checkout POS terminal 1 in a state where the first door 411 and the second door 412 are closed and the inside is tightly closed.

The first case body 41 includes a first electromagnetic lock 30 (first locking mechanism) (see FIG. 6) that is shifted between a locked state where the first door 411 is maintained in the closed state and cannot be opened and an unlocked state where the first door 411 can be opened. The electromagnetic lock is a key electromagnetically shifted between the unlocked state and the locked state. The electromagnetic lock is shifted to the locked state by distributing power to a solenoid, for example, to locate a lock pin at a locking position, and is shifted to the unlocked state by blocking the power distribution to locate the lock pin at the unlocking position.

The first door 411 and the second door 412 are brought into a state of being not able to be opened by bringing the first electromagnetic lock 30 into the locked state in a state where the first door 411 and the second door 412 are closed. If the first electromagnetic lock 30 is brought into the unlocked state, the first door 411 can be opened. If the first door 411 is opened, then the second door 412 is able to be opened.

The first case body 41 includes a second electromagnetic lock 31 (second locking mechanism) (see FIG. 6) that is shifted between a locked state where the money bar drawer 33 is maintained in a closed state and cannot be opened and an unlocked state where the money bar drawer 33 can be opened. If the second electromagnetic lock 31 is brought into the locked state in a state where the money bar drawer 33 is in the closed state, the money bar drawer 33 cannot be opened. If the second electromagnetic lock 31 is brought into the unlocked state, then the lock of the money bar drawer 33 is released, and the money bar drawer 33 can be opened.

The first door 411 includes a deposit hole 271, a dispense hole 273, and a receiving dish 272. The deposit hole 271 is a hole that is located in the upper surface of the first door 411 and is for opening an inserting slot for coins to be deposited in the coin change machine 34. The dispense hole 273 is a hole for opening a paying-out hole for paying out coins from the coin change machine 34. The receiving dish 272 is a dish that receives change coins paid out from the coin change machine 34.

The first door 411 includes a deposit hole 274 and a withdrawal hole 275. The deposit hole 274 is a hole for opening an inserting slit of bills to be deposited in the bill change machine 35. The withdrawal hole 275 is a hole for opening a paying-out hole for paying out bill changes paid from the bill change machine 35 in the upward direction.

The first case body 41 includes a basket placement table 25 and a basket placement table 26 on both left and right sides. The basket placement table 25 includes a first weighing unit 251. The basket placement table 26 includes a second weighing unit 261.

The basket placement table 25 is a table on which a basket with merchandise to be purchased is placed. The first weighing unit 251 measures a total weight of the basket and the merchandise in the basket placed on the basket placement table 25. The basket placement table 26 is a table on which a basket for putting the merchandise extracted from the basket placement table 25 thereinto is placed. The second weighing unit 261 measures a total weight of the basket and the merchandise in the basket placed on the basket placement table 26.

The basket placement table 26 includes two supports 43 extending upward from the upper surface of the basket placement table 26, a temporary placement table 44 formed above the supports 43, and two extending bars 45. The extending bars 45 are bars on which a plastic bag (not illustrated) for packaging merchandise after merchandise codes thereof are read by a reading unit 23 is hooked. The bag is opened in a state where handles thereof are hooked by the extending bars 45 such that the merchandise can be easily put into the bag. The temporary placement table 44 is a table for temporarily placing merchandise (tofu or eggs) that may easily break from among the merchandise after the merchandise codes thereof are read by the reading unit 23. The merchandise placed on the temporary placement table 44 is finally packaged in the bag.

The customer extracts the merchandise from the basket placed on the basket placement table 25, causes the merchandise to pass through the front of the reading unit 23, which will be described later, and causes the reading unit 23 to read codes attached to the merchandise. Then, the customer puts the merchandise into the basket placed on the basket placement table 26. A control unit 100 (see FIG. 6), which will be described later, measures variations in weight by the first weighing unit 251 measuring weights before and after the merchandise is extracted from the basket placed on the basket placement table 25. The control unit 100 measures variations in weight by the second weighing unit 261 measuring weights before and after the merchandise is put into the basket placed on the basket placement table 26. The control unit 100 determines whether the customer properly performs the operation based on whether or not both the variations in weight are equal to each other.

The second case body 42 is provided over the first case body 41. The second case body 42 accommodates the reading unit 23, a printing unit 24, and a card unit 28 in an accommodation unit 38 provided therein (see FIG. 4). The reading unit 23 is a device that optically reads the merchandise codes included in codes, such as barcodes or two-dimensional codes, attached to the merchandise, for example. The printing unit 24 prints transaction information of merchandise purchased by the customer and issues a receipt. The card unit 28 reads customer specification information from an inserted credit card, for example. The self-checkout POS terminal 1 executes accounting processing based on the customer specification information read by the card unit 28.

The second case body 42 includes two third doors 421 that are turned between an opened position and a closed position.

The third doors 421 are turned about a hinge 421a side by side. In a state where the third doors 421 are located at the opened position, the accommodation unit 38 of the second case body 42 is opened, and the reading unit 23, the printing unit 24, and the card unit 28 are brought into an exposed state. In a state where the third doors 421 are located at the closed position, the inside of the second case body 42 is tightly closed, and the reading unit 23, the printing unit 24, and the card unit 28 are tightly hidden inside the second case body 42. As described above, the self-checkout POS terminal 1 tightly closes the accommodation unit 38 for accommodating the reading unit 23, the printing unit 24, and the card unit 28 inside the second case body 42 by closing the third doors 421.

That is, the customer and the attendant cannot touch the reading unit 23, the printing unit 24, and the card unit 28 inside the second case body 42 from the outside of the second case body 42 in a state where the third doors 421 are closed and the accommodation unit 38 is tightly closed.

The second case body 42 includes a third electromagnetic lock 32 (see FIG. 6) that is shifted between a locked state where the third doors 421 are maintained in the closed state and cannot be opened and an unlocked state where the third doors 421 can be opened. If the third electromagnetic lock 32 is brought into the locked state while the third doors 421 are in the closed state, the third doors 421 cannot be opened. If the third electromagnetic lock 32 is brought into the unlocked state, then the lock of the third doors 421 is released, and the third doors 421 can be opened.

The third doors 421 include a hole 4212 from which a reading window of the reading unit 23 is exposed, a hole 4213 from which a receipt issued by the printing unit 24 is discharged, and a hole 4211 through which a card is inserted into the card unit 28.

The second case body 42 includes a display unit 22 at an upper portion. The display unit 22 displays merchandise information used for the registration operation by the customer. The display unit 22 displays accounting information used for the accounting operation by the customer. The display unit displays guidance for supporting the customer to appropriately perform the registration operation and the accounting operation for the customer. The display unit 22 displays an erroneous operation release method and an attendant calling method.

The display unit 22 includes a touch panel 21 provided on the surface thereof. The touch panel 21 functions as keys. By operating the touch panel 21 at positions corresponding to various keys displayed on the display unit 22, the corresponding keys are operated.

The second case body 42 includes a cylindrical pole 46, which extends upward, on the rear side. The pole 46 includes, at the upper tip end thereof, a light emitting unit 29 that emits light when the customer performs an operation of calling the attendant.

Figure 3:
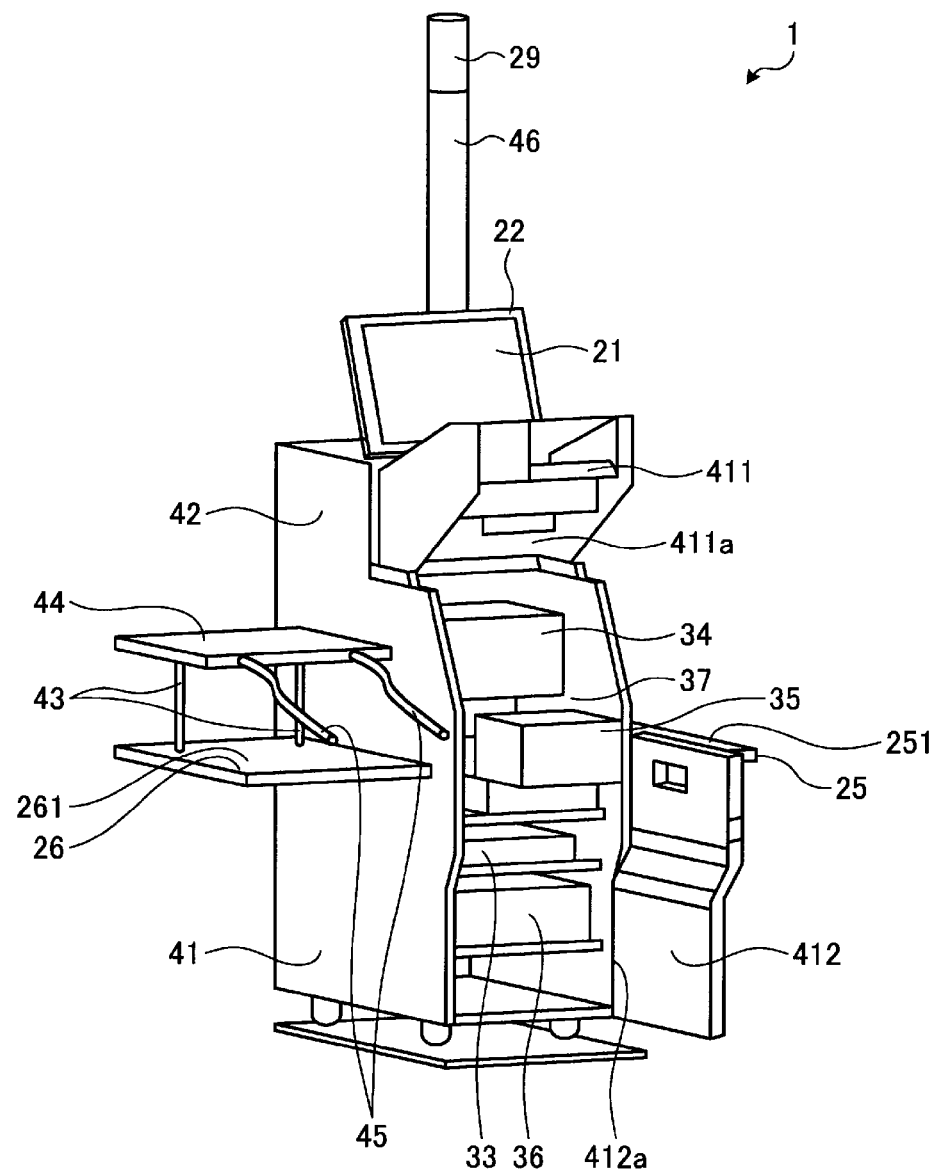
FIG. 3 is a perspective view illustrating an appearance of the self-checkout POS terminal with a door opened.

FIG. 3 is a perspective view illustrating an appearance of the self-checkout POS terminal 1 in a state where the first door 411 and the second door 412 are opened. Since the first door 411 is in the opened state in the upward direction as illustrated in FIG. 3, the self-checkout POS terminal 1 opens the inside thereof, and the accommodation unit 37 accommodating the coin change machine 34 and the bill change machine 35 is in the exposed state. Since the second door 412 is in the opened state in the right direction, the accommodation unit 37 accommodating the money bar drawer 33 and the control device 36 is in the exposed state.

Figure 4:
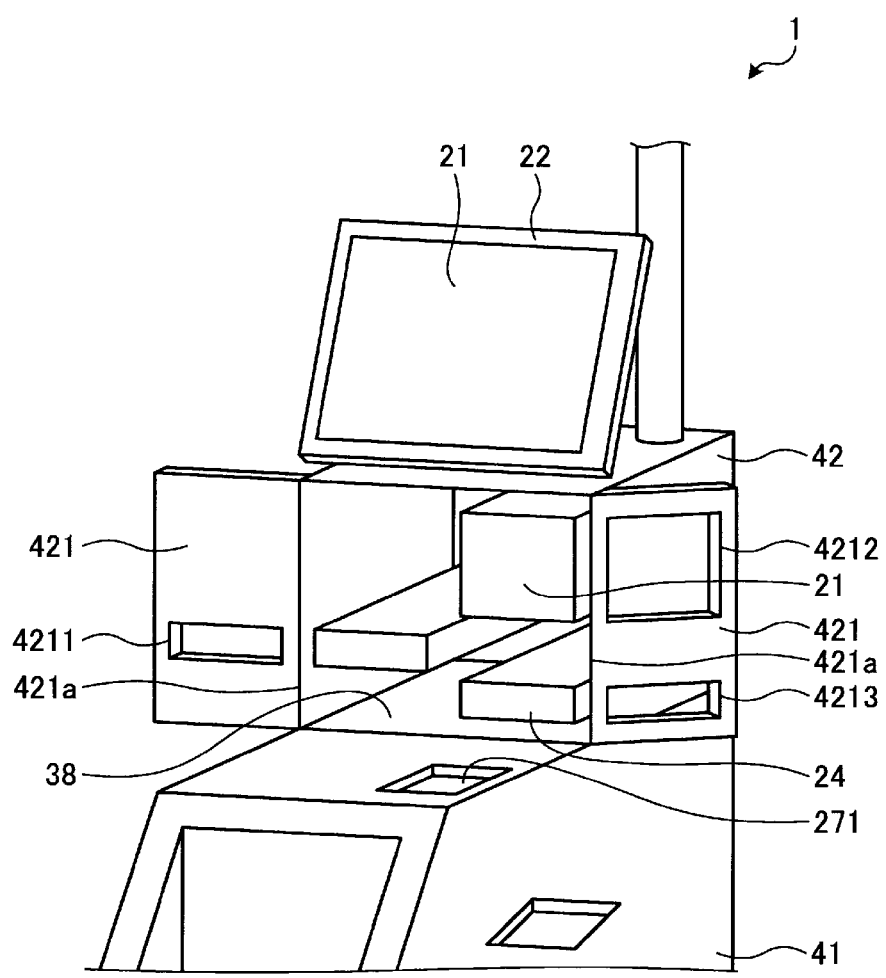
FIG. 4 is a perspective view illustrating an appearance of the self-checkout POS terminal with another door opened.

FIG. 4 is a perspective view illustrating an appearance of the self-checkout POS terminal 1 in a state where the third doors 421 are opened. Since the third doors 421 are in the side-by-side opened state from the center toward the opposite sides of the self-checkout POS terminal 1 as illustrated in FIG. 4, the self-checkout POS terminal 1 opens the inside thereof, and the accommodation unit 38 accommodating the reading unit 23, the printing unit 24, and the card unit 28 is in the exposed state.

Figure 5:
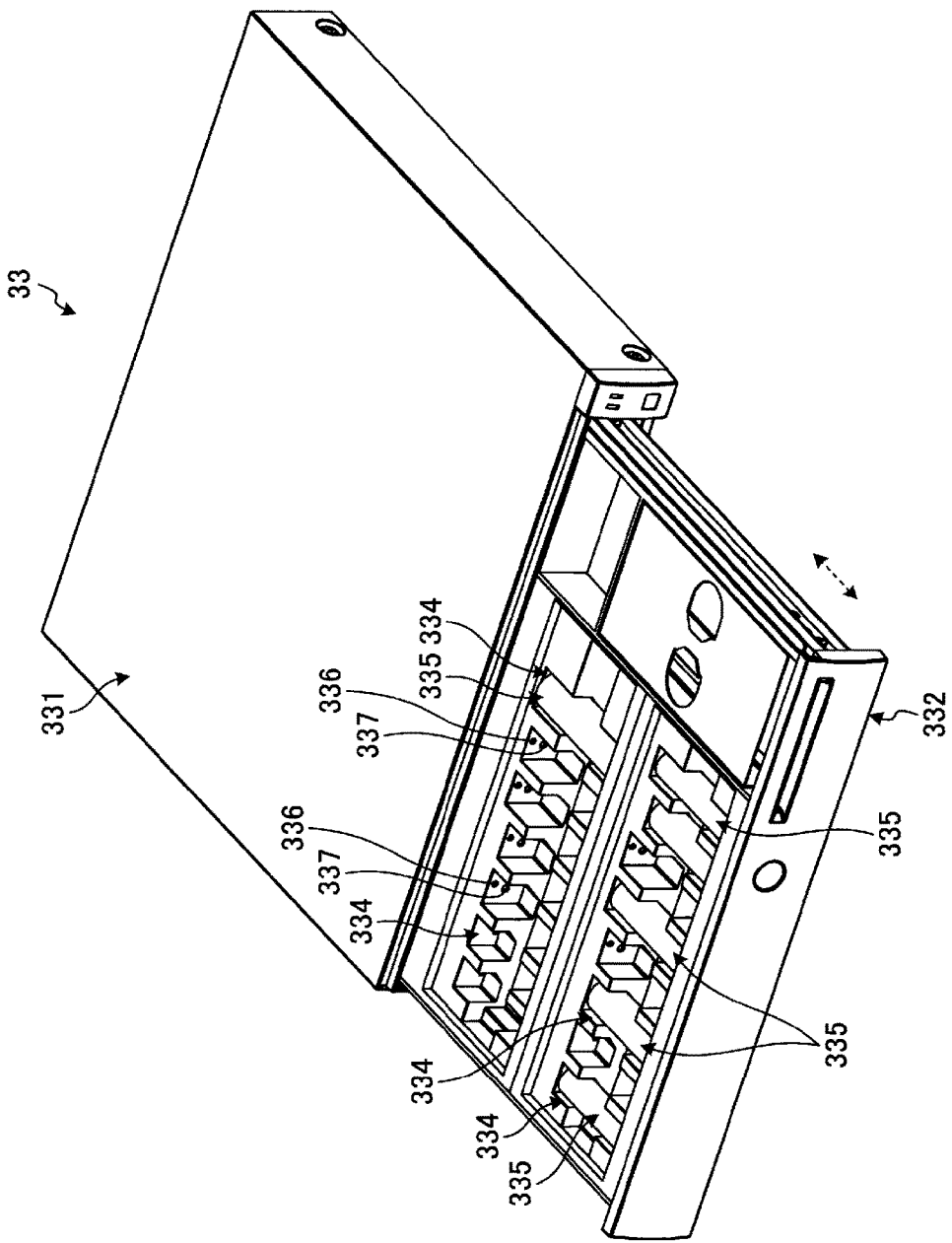
FIG. 5 is a perspective view illustrating an appearance of a money bar drawer.

FIG. 5 is a perspective view illustrating an appearance of the money bar drawer 33. As illustrated in FIG. 5, the money bar drawer 33 includes a case body portion 331 and a drawer portion 332. The case body portion 331 includes a box-shaped rectangular parallel-piped case body with a front surface opened. The drawer portion 332 can appear from the front surface of the case body portion 331. The drawer portion 332 is brought into a closed state at a position of being pushed into the case body portion 331, and is brought into an opened state at a position of popping out from the case body portion 331. The second electromagnetic lock 31 maintains the money bar drawer 33 in the closed state (the money bar drawer 33 cannot be opened) by bringing the drawer portion 332 into the locked state at the position of being pushed into the case body portion 331. If the second electromagnetic lock 31 is brought into the unlocked state, the lock of the money bar drawer 33 is released, and the drawer portion 332 is brought into a state (opened state) of slightly projecting from the case body portion 331.

The drawer portion 332 includes a plurality of money bar accommodation units 334 aligned in parallel in two lines. Each of the money bar accommodation units 334 includes two transmission-type money bar sensors 336 and 337. The money bar sensors 336 and 337 output information about whether or not a money bar 335 is accommodated in each money bar accommodation unit 334 and information for specifying a money type of the money bar if the money bar 335 is accommodated in the money bar accommodation unit 334. The control unit 100, which will be described later, recognizes the money types and the numbers of money bars accommodated in the money bar drawer 33 based on the information output from the money bar sensors 336 and 337. Then, the control unit 100 calculates the total price of the coins accommodated in the money bar drawer 33 based on the money types and the numbers of the identified money bars. The control unit 100 calculates the number of new money bars and the total price every time the number of money bars accommodated in the money bar drawer 33 changes.

Figure 6:
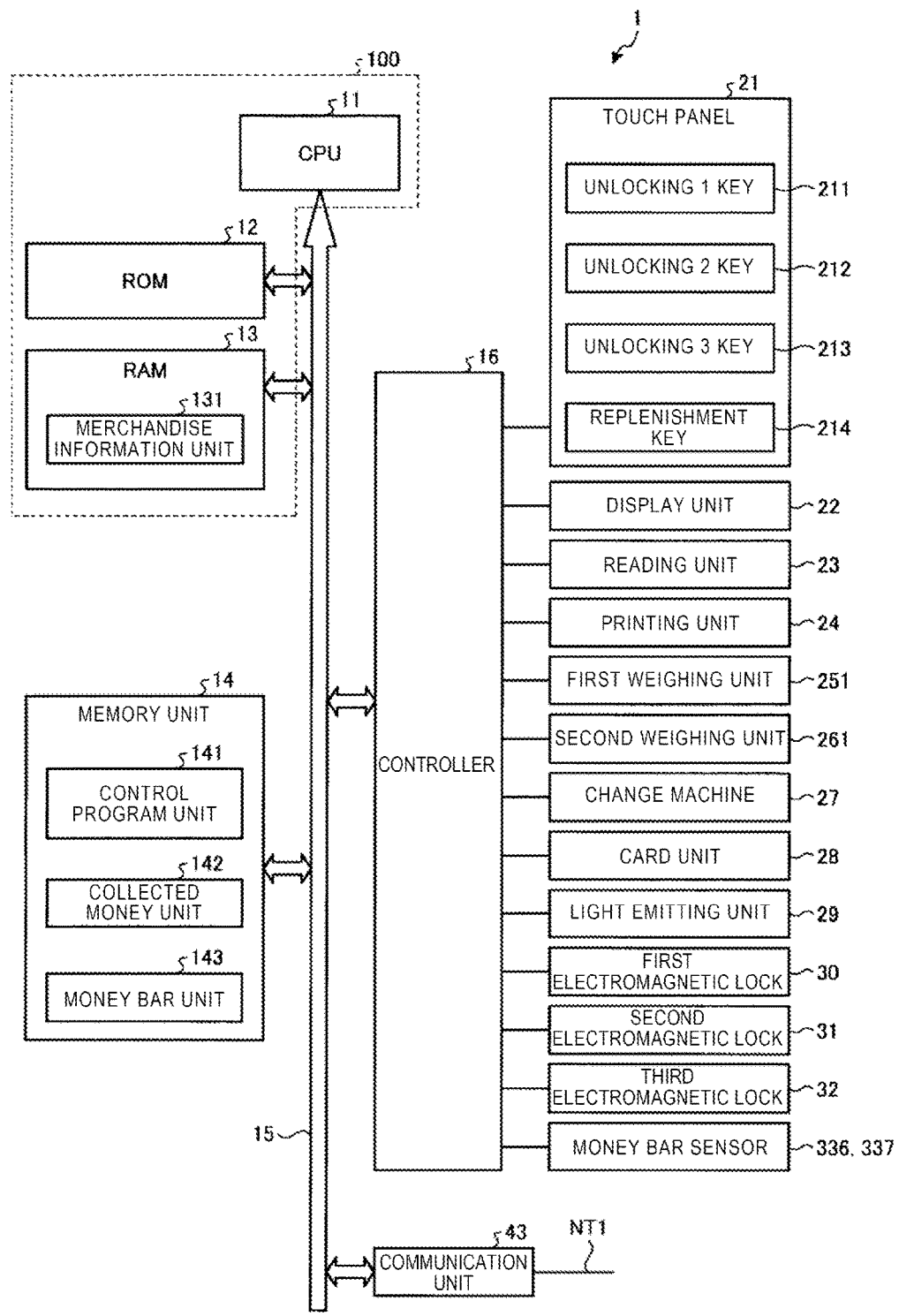
FIG. 6 is a block diagram illustrating a hardware configuration of the self-checkout POS terminal.

Hereinafter, description will be given of hardware configurations of the self-checkout POS terminal 1, the attendant PC 2, and the mobile attendant PC 3. FIG. 6 is a bock diagram illustrating a hardware configuration of the self-checkout POS terminal 1. As illustrated in FIG. 6, the self-checkout POS terminal 1 includes a Central Processing Unit (CPU) 11, a Read Only Memory (ROM) 12, a Random Access Memory (RAM) 13, a memory unit 14, and the like. The CPU 11 is a subject of control. The ROM 12 stores various programs. The RAM 13 develops various kinds of data. The memory unit 14 stores various programs. The CPU 11, the ROM 12, the RAM 13, and the memory unit 14 are connected to each other via a data bus 15. The CPU 11, the ROM 12, and the RAM 13 form the control unit 100. That is, the control unit 100 executes control processing, which will be described later, by the CPU 11 operating in accordance with a control program stored in the ROM 12 or the memory unit 14 and developed in the RAM 13.

The memory unit 14 is formed of a non-volatile memory, such as a Hard Disc Drive (HDD) or a flash memory, which maintains stored information even after the power is turned off, and includes a control program unit 141 that stores the control program. The memory unit 14 includes a collected money unit 142 and a money bar unit 143. The collected money unit 142 stores a price of money accommodated in the change machine 27. Specifically, the collected money unit 142 counts the price of money to be accommodated in the accommodation unit of the change machine 27 and a price of money to be paid from the accommodation unit for each money type, and stores the balance amount therebetween as a price of money accommodated in the change machine 27.

The money bar unit 143 stores the number and the total price of the money bars stocked in the money bar drawer 33 for each money type. Specifically, the control unit 100 calculates the number and the price of money bars stocked in the money bar drawer 33 for each money type based on the information output from the money bar sensors 336 and 337 in the money bar drawers 33, and stores the number and the price in the money bar unit 143. More specifically, the control unit 100 recognizes the money type and the number of money bars based on the information output from the money bar sensors 336 and 337. Since the number of coins in one money bar is fixed to fifty, for example, the price of each money bar of each money type can be recognized. For example, the price of one 10-yen coin money bar is 500 yen. Therefore, if the money types and the numbers of money bars can be recognized, it is possible to obtain the total price of coins stocked in the money bar drawer 33 by multiplying the price per money bar by the number of money bars and performing the multiplication for all the money bars.

The control unit 100 is connected to the touch panel 21, the display unit 22, the reading unit 23, the printing unit 24, the first weighing unit 251, the second weighing unit 261, the change machine 27, the card unit 28, the light emitting unit 29, the first electromagnetic lock 30, the second electromagnetic lock 31, the third electromagnetic lock 32, the money bar sensor 336, and the money bar sensor 337 via the data bus 15 and a controller 16.

The touch panel 21 includes an unlocking 1 key 211 corresponding to display of an "unlocking 1 key" on the display unit 22, an unlocking 2 key 212 corresponding to display of an "unlocking 2 key", an unlocking 3 key 213 corresponding to display of an "unlocking 3 key", and a replenishment key 214 corresponding to display of a "replenishment key". In the following description, "keys provided in the touch panel 21 corresponding to display of the keys on the display unit" will be simplified as "keys displayed on the display unit", for example.

The unlocking 1 key 211 is a key to be operated for bringing the first electromagnetic lock 30 in the locked state into the unlocked state. The unlocking 2 key 212 is a key to be operated for bringing the second electromagnetic lock 31 in the locked state into the unlocked state. The unlocking 3 key 213 is a key to be operated for bringing the third electromagnetic lock in the locked state into the unlocked state. The replenishment key 214 is a key operated for bringing both the first electromagnetic lock 30 and the second electromagnetic lock 31 in the locked state into the unlocked state.

The control unit 100 is connected to a communication unit 43 via the data bus 15. The communication unit 43 transmits and receives information to and from other self-checkout POS terminals 1 or the attendant PC 2 via the communication line NT1.

Figure 7:
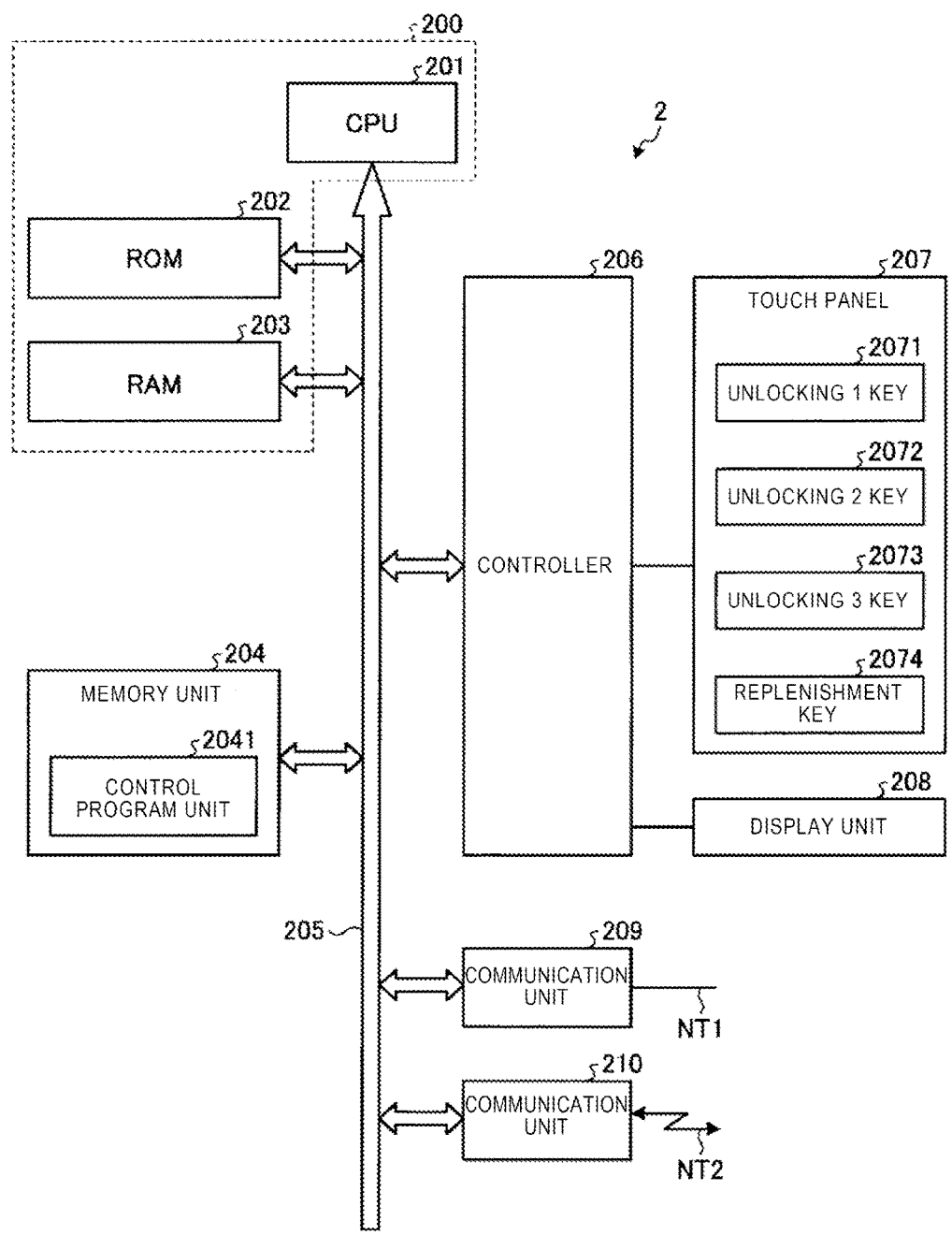
FIG. 7 is a block diagram illustrating a hardware configuration of an attendant PC.

FIG. 7 is a block diagram illustrating a hardware configuration of the attendant PC 2. As illustrated in FIG. 7, the attendant PC 2 includes a CPU 201, a ROM 202, a RAM 203, a memory unit 204, and the like. The CPU 201 is a subject of control. The ROM 202 stores various programs. The RAM 203 develops various kinds of data. The memory unit 204 stores various programs. The CPU 201, the ROM 202, the RAM 203, and the memory unit 204 are connected to each other via a data bus 205. The CPU 201, the ROM 202, and the RAM 203 form a control unit 200. That is, the control unit 200 executes control processing, which will be described later, by the CPU 201 operating in accordance with a control program stored in the ROM 202 or the memory unit 204 and developed in the RAM 203.

The memory unit 204 is formed of a non-volatile memory, such as a Hard Disc Drive (HDD) or a flash memory, which maintains stored information even after the power is turned off, and includes a control program unit 2041 that stores the control program.

The control unit 200 is connected to a touch panel 207 and a display unit 208 via the data bus 205 and a controller 206. The touch panel 207 includes an unlocking 1 key 2071, an unlocking 2 key 2072, an unlocking 3 key 2073, and a replenishment key 2074 displayed on the display unit 208. The function of the unlocking 1 key 2071 is the same as that of the unlocking 1 key 211. The function of the unlocking 2 key 2072 is the same as that of the unlocking 2 key 212. The function of the unlocking 3 key 2073 is the same as that of the unlocking 3 key 213. The function of the replenishment key 2074 is the same as that of the replenishment key 214.

The control unit 200 is connected to a communication unit 209 via the data bus 205. The control unit 200 transmits and receives information to and from each self-checkout POS terminal 1 via the communication unit 209 and the communication line NT1. The control unit 200 is connected to a communication unit 210 via the data bus 205. The control unit 200 transmits and receives information to and from the mobile attendant PC 3 via the communication unit 210 and the communication line NT2.

Figure 8:
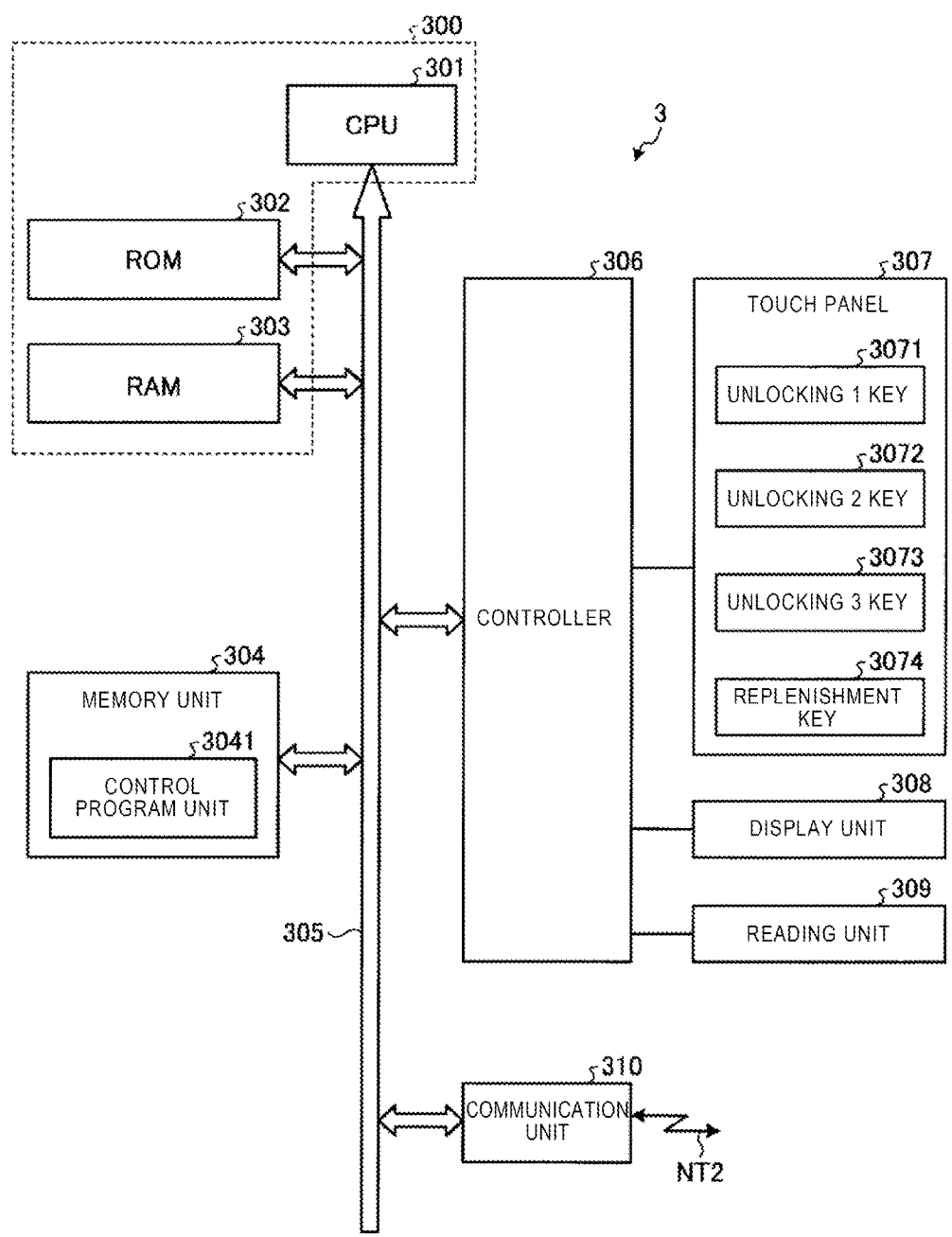
FIG. 8 is a block diagram illustrating a hardware configuration of a mobile attendant PC.

FIG. 8 is a block diagram illustrating a hardware configuration of the mobile attendant PC 3. As illustrated in FIG. 8, the mobile attendant PC 3 includes a CPU 301, a ROM 302, a RAM 303, a memory unit 304, and the like. The CPU 301 is a subject of control. The ROM 302 stores various programs. The RAM 303 develops various kinds of data. The memory unit 304 stores various programs. The CPU 301, the ROM 302, the RAM 303, and the memory unit 304 are connected to each other via a data bus 305. The CPU 301, the ROM 302, and the RAM 303 form a control unit 300. That is, the control unit 300 executes control processing, which will be described later, by the CPU 301 operating in accordance with a control program stored in the ROM 302 or the memory unit 304 and developed by the RAM 303.

The memory unit 304 is formed of a non-volatile memory, such as a Hard Disc Drive (HDD) or a flash memory, which maintains stored information even after the power is turned off, and includes a control program unit 3041 that stores the control program.

The control unit 300 is connected to a touch panel 307, a display unit 308, and a reading unit 309 via the data bus 305 and a controller 306. The touch panel 307 includes an unlocking 1 key 3071, an unlocking 2 key 3072, an unlocking 3 key 3073, and a replenishment key 3074 displayed on the display unit 308. The function of the unlocking 1 key 3071 is the same as that of the unlocking 1 key 211. The function of the unlocking 2 key 3072 is the same as that of the unlocking 2 key 212. The function of the unlocking 3 key 3073 is the same as that of the unlocking 3 key 213. The function of the replenishment key 3074 is the same as that of the replenishment key 214. The reading unit 309 has the same configuration as that of the reading unit 23.

The control unit 300 is connected to a communication unit 310 via the data bus 305. The control unit 300 transmits and receives information to and from the attendant PC 2 via the communication unit 310 and the communication line NT2.

Figure 9:
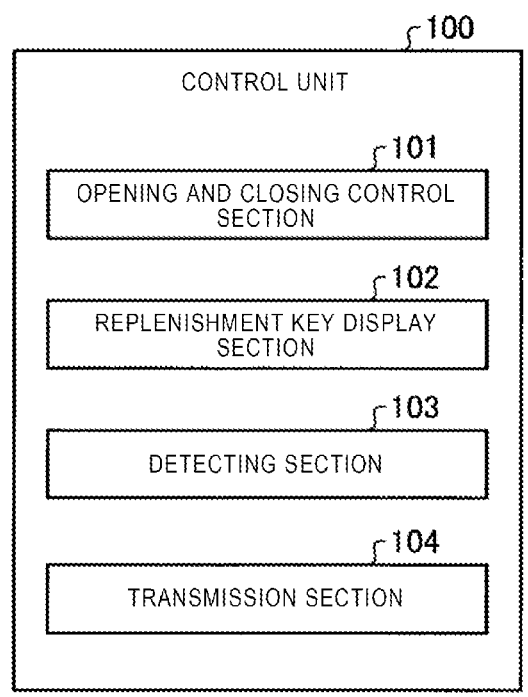
FIG. 9 is a functional block diagram illustrating a functional configuration of the self-checkout POS terminal.

Hereinafter, detailed description will be given of control of the self-checkout POS terminal 1 in accordance with a customer's operation with reference to FIGS. 9 to 24. FIG. 9 is a functional block diagram illustrating a functional configuration of the self-checkout POS terminal 1. The control unit 100 follows the control program stored in the ROM 12 or the control program unit 141 of the memory unit 14 and functions as an opening and closing control section 101, a replenishment key display section 102, a detecting section 103, and a transmission section 104.

The opening and closing control section 101 has a function of maintaining the first electromagnetic lock 30 in the locked state in a normal mode in which the accounting processing of driving the coin change machine 34 such that the coin change machine 34 pays out a change with respect to the price of the merchandise and enabling the first electromagnetic lock 30 to be shifted to the unlocked state in an unlocking mode based on an input of a code of an attendant who is authorized to permit the unlocking of the electromagnetic lock.

The replenishment key display section 102 has a function of displaying, on the display unit 22, the replenishment key 214 for providing an instruction for replenishing the coin change machine 34 with coins from the money bar drawer 33.

The detecting section 103 has a function of detecting shortage of coins in the coin change machine 34.

The transmission section 104 has a function of transmitting display information for causing the mobile attendant PC 3, which can be carried, to display the replenishment key 3074 to the outside.

Figure 10:
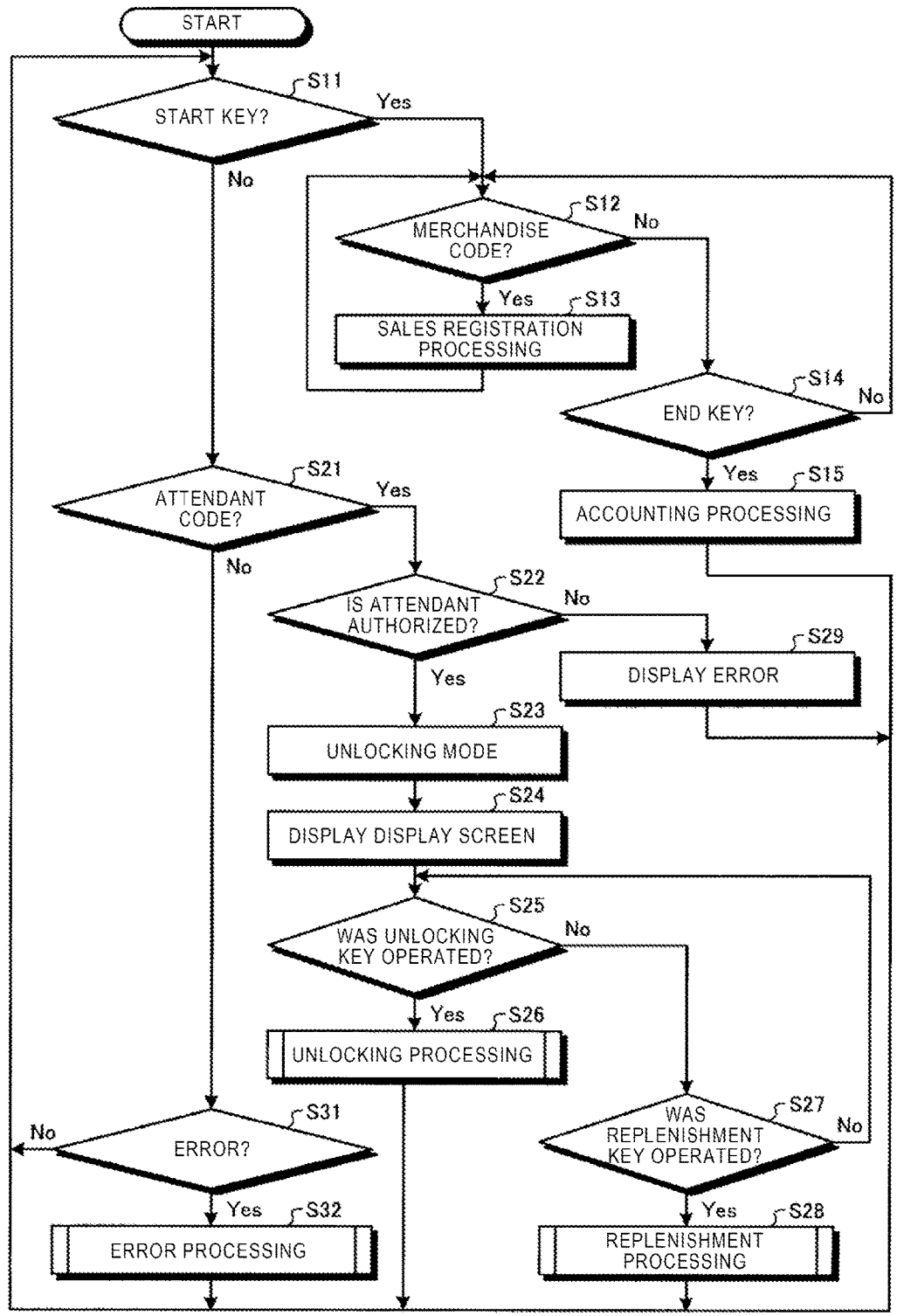
FIG. 10 is a flowchart illustrating a flow for control processing in the self-checkout POS terminal.

FIGS. 10 to 24 are flowcharts illustrating a flow of the control processing of the self-checkout POS terminal 1 and diagrams illustrating related display screens. First, the control unit 100 is set in the normal mode when the self-checkout POS terminal 1 is in a standby state. Then, the control unit 100 determines whether or not a start key (not illustrated) displayed on the display unit 22 was operated when the self-checkout POS terminal 1 is in the standby state as illustrated in FIG. 10 (Act11). The start key is operated by the customer when the operation of the self-checkout POS terminal 1 is started. If it is determined that the start key was operated (Yes in Act11), then the control unit 100 determines whether or not a merchandise code for specifying merchandise was input from the reading unit 23 by a customer's registration operation (Act12). If it is determined that the merchandise code was input (Yes in Act12), the control unit 100 executes sales registration processing of reading merchandise information corresponding to the input merchandise code from a merchandise master (not illustrated) and storing the merchandise information in a merchandise information unit 131 (Act13). Then, the control unit 100 returns to Act12. The control unit 100 executes the processing in Act11 to Act15 in the normal mode. In the normal mode, the customer and the attendant cannot open the first door 411, the second door 412, and the third doors 421 of the self-checkout POS terminal 1 and touch the respective elements inside the doors.

If it is determined that the merchandise code was not input (No in Act12), the control unit 100 determines whether or not an end key (not illustrated) displayed on the display unit 22 for completing the sales registration processing was operated (Act14). The end key is operated by the customer for completing the registration operation by using the self-checkout POS terminal 1. If it is determined that the end key was operated (Yes in Act14), the control unit 100 executes accounting processing based on the merchandise information stored in the merchandise information unit 131 (Act15). Then, the control unit 100 returns to Act11. If it is determined that the end key was not operated (No in Act14), the control unit 100 returns to Act12.

In contrast, if it is determined in Act11 that the start key was not operated (No in Act11), the control unit 100 determines whether or not the attendant code was input from the reading unit 23 (Act21). The attendant code is a code for specifying an attendant and is printed in the form of a barcode on an employee ID card, for example, carried by the attendant. The self-checkout POS terminal 1 is configured such that the attendant inputs the attendant code by causing the reading unit 23 to read the employee ID card.

If it is determined that the attendant code was input (Yes in Act21), the control unit 100 determines whether or not the attendant of the input attendant code is authorized to unlock the self-checkout POS terminal 1 (Act22). Since money accommodated in the self-checkout POS terminal 1 is handled, only specific persons in the store, such as a manager or leaders of the sales floor, are authorized to unlock the self-checkout POS terminal 1. Therefore, the control unit 100 determines whether or not the attendant is authorized to unlock the self-checkout POS terminal 1 based on the input attendant code.

If it is determined that the attendant code is a code of an attendant who is authorized (information for permitting unlocking of the locking mechanism) (Yes in Act22), the control unit 100 switches the self-checkout POS terminal 1 from the normal mode to the unlocking mode (Act23). Then, the control unit 100 (replenishment key display section 102) displays, on the display unit 22, a display screen on which an unlocking key for unlocking the electromagnetic lock is displayed (Act24).

Figure 11:
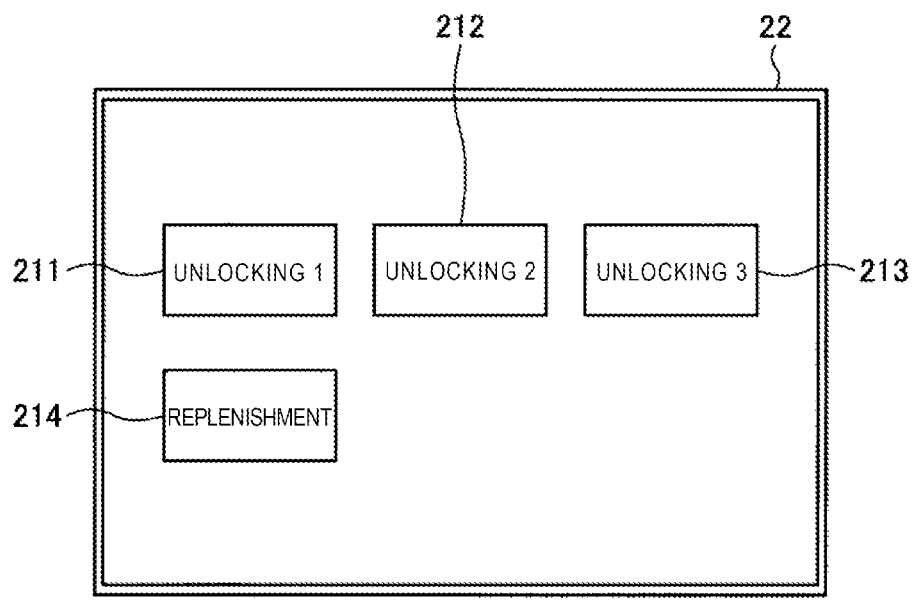
FIG. 11 is a diagram illustrating an example of a display screen on a display unit of the self-checkout POS terminal.

FIG. 11 is a diagram illustrating an example of the display screen, on which the unlocking key is displayed, on the display unit 22 in Act24. As illustrated in FIG. 11, the control unit 100 displays the unlocking 1 key 211, the unlocking 2 key 212, the unlocking 3 key 213, and the replenishment key 214 on the display unit 22.

Description will be returned to FIG. 10. Next, the control unit 100 determines whether or not the attendant operated any one of the unlocking 1 key 211, the unlocking 2 key 212, and the unlocking 3 key 213 (Act25). If it is determined that any of the unlocking keys was operated (Yes in Act25), the control unit 100 executes unlocking processing, which will be described in detail with reference to FIG. 12 (Act26). Then, the control unit 100 returns to Act11. If it is determined that any one of the unlocking keys was not operated (No in Act25), the control unit 100 determines whether or not the replenishment key 214 was operated (At27). If it is determined that the replenishment key 214 was operated (Yes in Act27), the control unit 100 executes change replenishment processing, which will be described in detail with reference to FIG. 13 (Act28). Then, the control unit 100 returns to Act11. If it is determined that the attendant did not operate the replenishment key 214 (No in Act27), the control unit 100 returns to Act25.

If it is determined in Act22 that the attendant with the input attendant code was not authorized to unlock the self-checkout POS terminal 1 (No in Act22), the control unit 100 displays, on the display unit 22, an error message indicating that the attendant with the attendant code is not authorized to unlock the self-checkout POS terminal 1 (Act29). Then, the control unit 100 returns to Act11.

In contrast, if it is determined in Act21 that the attendant code was not input from the reading unit 23 (No in Act21), the control unit 100 (detecting section 103) determines whether or not an error occurred in the self-checkout POS terminal 1 (Act31). In addition to so-called errors, such as clogging of a receipt sheet in the printing unit 24 and clogging of money in the change machine 27, for example, the error includes a state where a receipt sheet role accommodated in the printing unit 24 will be finished up soon or a state where the number of coins accommodated in the change machine 27 is less than a predetermined number (which will be collectively referred to as a "shortage state"), which are not errors.

If it is determined that an error occurred (Yes in Act31), the control unit 100 executes error processing, which will be described in detail with reference to FIGS. 15 to 24 (Act32). Then, the control unit 100 returns to Act11. If it is determined that no error occurred (No in Act31), the control unit 100 returns to Act11.

Figure 12:
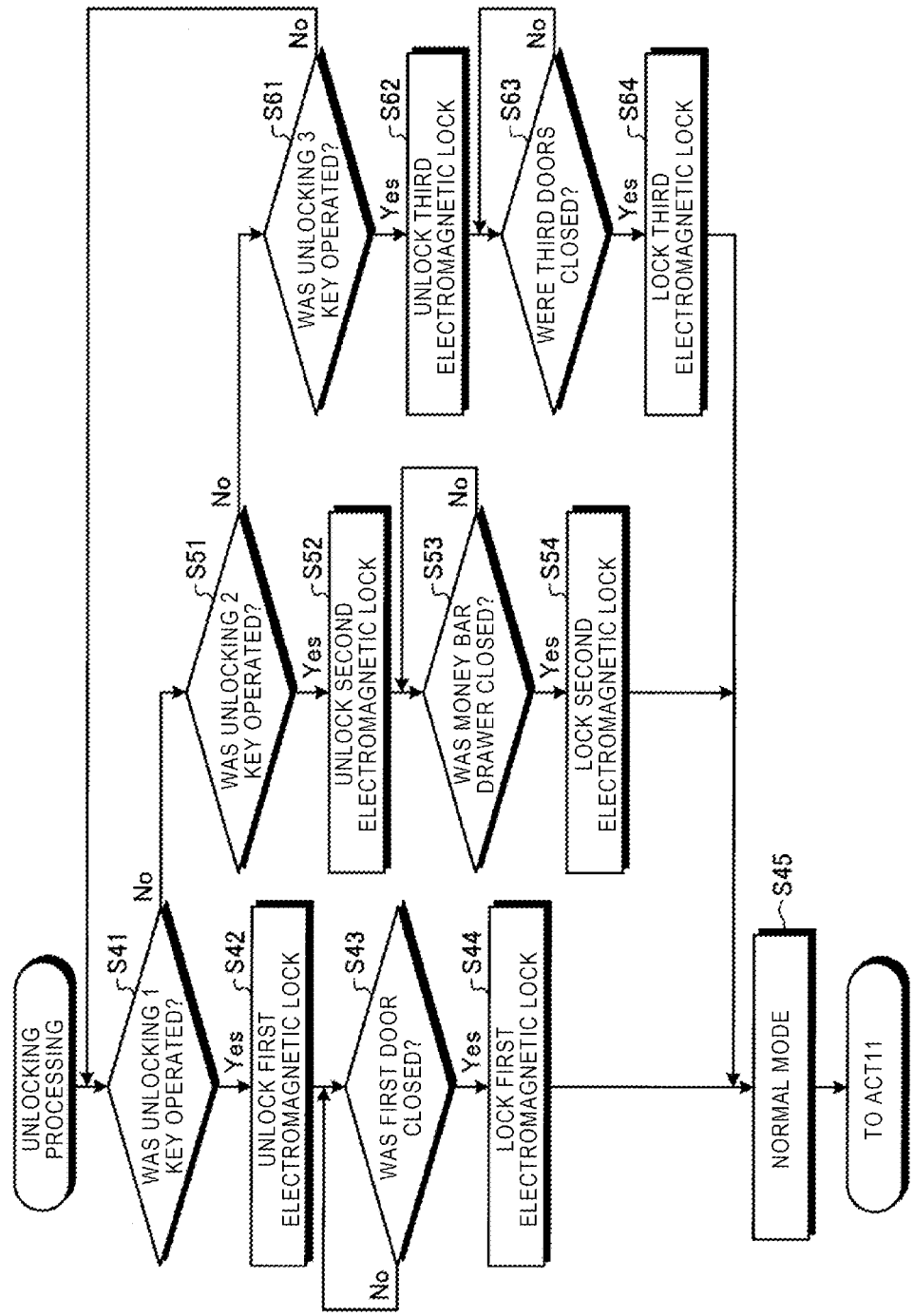
FIG. 12 is a flowchart illustrating a flow for control of unlocking processing in the self-checkout POS terminal.

Next, description will be given of the unlocking processing in Act26. FIG. 12 is a flowchart illustrating a flow for control of the unlocking processing performed by the self-checkout POS terminal 1. As illustrated in FIG. 12, the control unit 100 determines whether or not the unlocking key operated in Act25 is the unlocking 1 key 211 (Act41). If an error such as clogging of a change occurs in the change machine 27, for example, the attendant operates the unlocking 1 key 211. If it is determined that the unlocking key operated is the unlocking 1 key 211 (Yes in Act41), the control unit 100 brings the first electromagnetic lock 30 into the unlocked state (Act42). In this state, the closing state of the first door 411 is released, becomes able to be turned about the hinge 411*a*, and is brought into the opened state. The attendant opens the first door 411 and then opens the second door 412 about the hinge 412*a*. In this state, the second electromagnetic lock 31 is maintained in the locked state. Then, the attendant solves the error state such as clogging of money by opening the coin change machine 34 or the bill change machine 35.

The attendant closes the second door 412 and the first door 411 in this order after solving the error state. The control unit 100 determines whether or not the first door 411 was closed (Act43). The control unit 100 makes the determination in Act43 based on an output from a sensor that detects opening and closing of the first door 411. The control unit 100 waits for the closing of the first door 411 (No in Act43), and if it is determined that the first door 411 was closed (Yes in Act43), the control unit 100 brings the first electromagnetic lock 30 into the locked state and brings the first door 411 into a state of being not able to be opened (Act44). Then, the control unit 100 switches the self-checkout POS terminal 1 to the normal mode (Act45). Then, the control unit 100 returns to Act11.

In contrast, if it is determined that the unlocking key operated in Act25 is not the unlocking 1 key 211 (No in Act41), the control unit 100 determines whether or not the unlocking key operated in Act25 is the unlocking 2 key 212 (Act51). If the money bar drawer 33 is to be opened in order to replenish the change machine with the money bars or extract money bars after the unlocking 1 key 211 is operated, the attendant operates the unlocking 2 key 212 to unlock the second electromagnetic lock 31. If it is determined that the unlocking key operated in Act25 is the unlocking 2 key 212 (Yes in Act51), the control unit 100 brings the second electromagnetic lock 31 into the unlocked state (Act52). In this state, the closing state of the money bar drawer 33 is released and brought into an opened state where the drawer portion 332 slightly projects forward from the case body portion 331. The attendant pulls the projecting drawer portion 332 toward the attendant themselves. Then, the attendant replenishes the money bar drawer 33 with money bars or extracts money bars therefrom.

The attendant pushes the drawer portion 332 into the case body portion 331 after extracting the money bars or replenishing the money bar drawer 33 with the money bars. The control unit 100 determines whether or not the money bar drawer 33 was closed (Act53). The control unit 100 makes the determination in Act53 based on an output from a sensor that detects opening and closing of the money bar drawer 33. The control unit 100 waits for the closing of the money bar drawer 33 (No in Act53), and if it is determined that the money bar drawer 33 was closed (Yes in Act53), the control unit 100 brings the second electromagnetic lock 31 into the locked state and brings the money bar drawer 33 into a state of being not able to be opened (Act54). Then, the control unit 100 executes Act45. Then, the control unit 100 returns to Act11.

If it is determined that the unlocking key operated in Act25 is not the unlocking 2 key 212 (No in Act51), the control unit 100 determines whether or not the unlocking key operated in Act25 is the unlocking 3 key 213 (Act61). If it is determined that the unlocking key operated is the unlocking 3 key 213 (Yes in Act61), the control unit 100 brings the third electromagnetic lock 32 into the unlocked state (Act62). In this state, the closing state of the third doors 421 is released, becomes able to be turned side by side about the hinge 421*a*, and is brought into the opened state. The attendant opens the third doors 421. Then, the attendant solves the error state in the printing unit 24 or the card unit 28. If it is determined that the unlocking key operated is not the unlocking 3 key 213 (No in Act61), the control unit 100 returns to Act41.

The attendant closes the third doors 421 after solving the error state. The control unit 100 determines whether or not the third doors 421 were closed (Act63). The control unit 100 makes the determination in Act63 based on an output from a sensor that detects opening and closing of the third doors 421. The control unit 100 waits for the closing of the third doors 421 (No in Act63), and if it is determined that the third doors 421 were closed (Yes in Act63), the control unit 100 brings the third electromagnetic lock 32 into the locked state and brings the third doors 421 into the state of being not able to be opened (Act64). Then, the control unit 100 executes the processing in Act45. Then, the control unit 100 returns to Act11.

Figure 13:
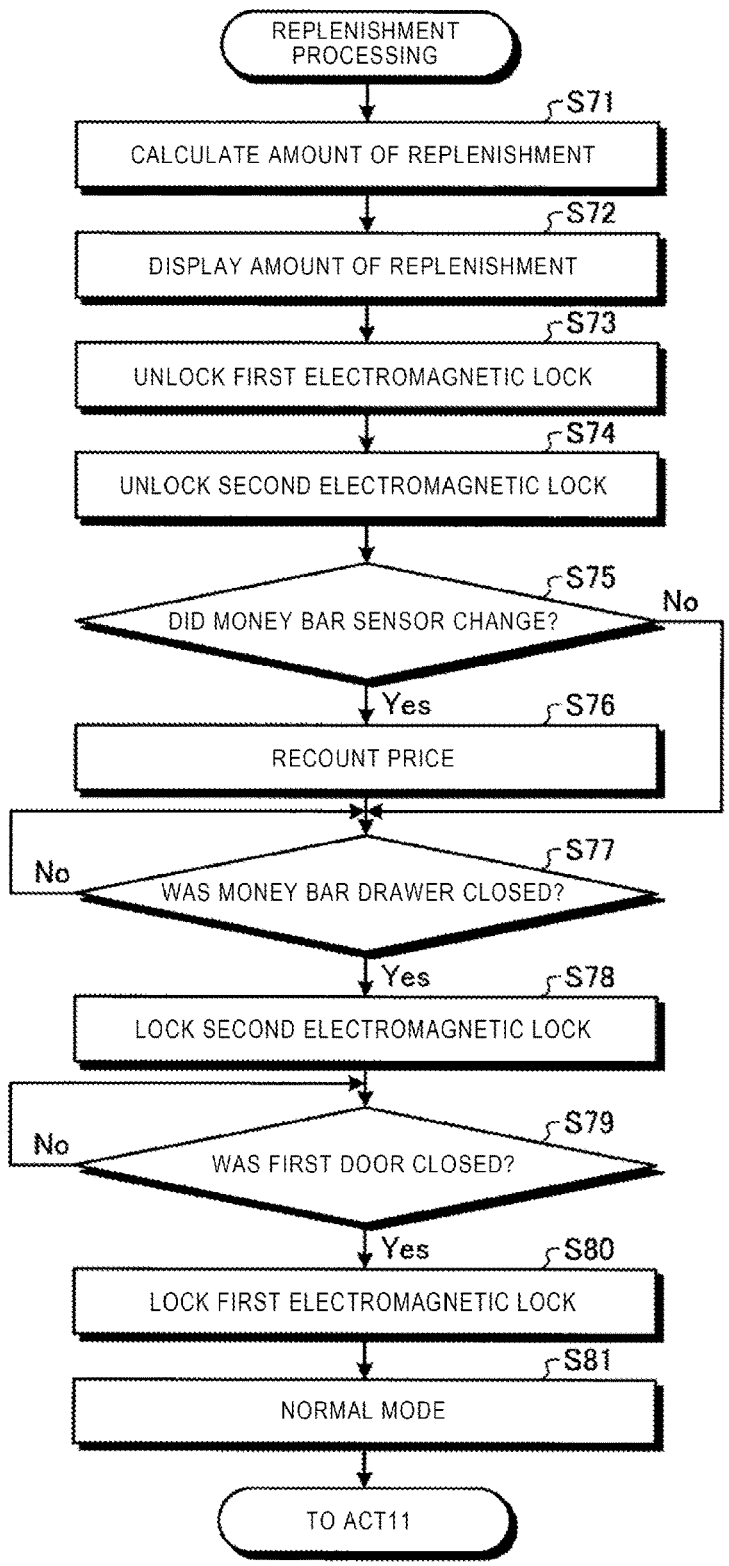
FIG. 13 is a flowchart illustrating a flow for control of replenishment processing in the self-checkout POS terminal.

Next, description will be given of change replenishment processing in Act28. FIG. 13 is a flowchart illustrating a flow for control of the change replenishment processing in the self-checkout POS terminal 1. First, the control unit 100 calculates the price of coins accommodated in the coin change machine 34. Specifically, since the coin change machine 34 recognizes the appropriate number of accommodated coins of each money type, the control unit 100 compares the appropriate number of accommodated coins with the number of coins currently accommodated in the accommodation unit. Then, the control unit 100 calculates whether or not the coins in the coin change machine 34 are short and how much is to be prepared to replenish the coin change machine 34 (Act71). For the money type that is short, the amount of replenishment is displayed as the number of money bars (Act72).

Figure 14:
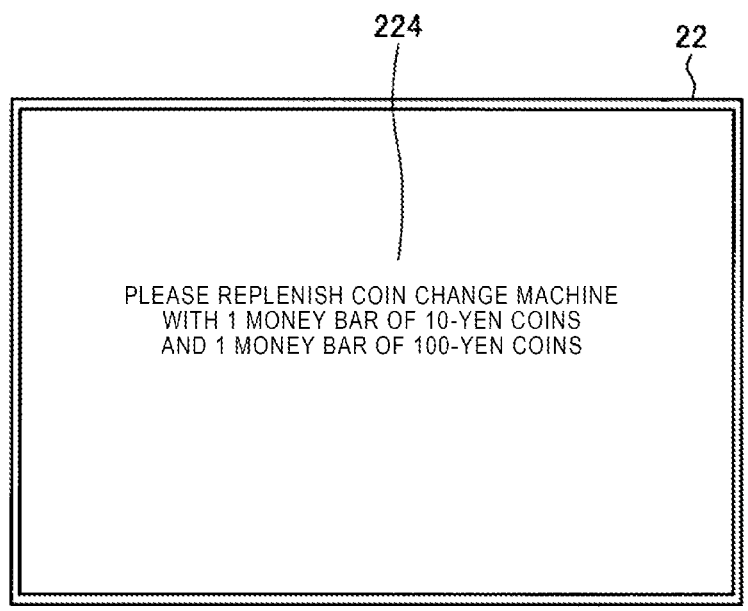
FIG. 14 is a diagram illustrating an example of a display screen, which performs display prompting replenishment of coins, on the display unit in the self-checkout POS terminal.

FIG. 14 is a diagram illustrating a display example of the display screen in Act72. A display 224 of a message indicating that the coin change machine 34 is to be replenished with 10-yen coins and 100-yen coins and that the number of money bar of the 10-yen coins as a target of the replenishment is one and the number of money bar of the 100-yen coins as a target of the replenishment is 1 is illustrated.

Description will be returned to FIG. 13. Next, the control unit 100 unlocks the first electromagnetic lock 30 and brings the first door 411 into the opened state (Act73). Subsequently, the control unit 100 unlocks the second electromagnetic lock 31 and brings the money bar drawer 33 into the opened state (Act74). In this state, the attendant extracts money bars of 10-yen coins and 100-yen coins from the money bar drawer 33. Then, the attendant breaks the package sealing of the extracted money bar of 10-yen coins and replenishes a 10-yen coin accommodation unit with fifty 10-yen coins. Furthermore, the attendant breaks the package sealing of the extracted money bar of 100-yen coins and replenishes a 100-yen coin accommodation unit with fifty 100-yen coins.

The control unit 100 determines whether or not outputs from the money bar sensor 336 and the money bar sensor 337 changed by the extraction of the money bar of 10-yen coins and the money bar of 100-yen coins from the money bar drawer 33 (Act75). If it is determined that the outputs changed (Yes in Act75), the control unit 100 recounts the numbers of money bars of 10-yen coins and the money bars of 100-yen coins in the money bar drawer 33, which are stored in the money bar unit 143, by subtracting the numbers by 1 based on the changed detection outputs from the money bar sensor 336 and the money bar sensor 337 (Act76). The control unit 100 counts fifty 10-yen coins and fifty 100-yen coins with which the coin change machine 34 was replenished, and updates the numerical value stored in the collected money unit 142.

If the replenishment with coins is completed, the attendant pushes the drawer portion 332 of the money bar drawer 33 into the case body portion 331 first and brings the money bar drawer 33 into the closed state. The control unit 100 determines whether or not the money bar drawer 33 was brought into the closed state (Act77). The control unit 100 waits for the closed state (No in Act77), and if it is determined that the money bar drawer 33 was brought into the closed state (Yes in Act77), the control unit 100 brings the second electromagnetic lock 31 into the locked state (Act78).

Next, the control unit 100 determines whether or not the first door 411 was brought into the closed state (Act79). The control unit 100 waits for the closed state (No in Act79), and if it is determined that the first door 411 was brought into the closed state (Yes in Act79), the control unit 100 brings the first electromagnetic lock 30 into the locked state (Act80). Then, the control unit 100 switches the self-checkout POS terminal 1 into the normal mode (Act81). Then, the control unit 100 returns to Act11. If no change occurred in the outputs from the money bar sensor 336 and the money bar sensor 337 in Act75 (No in Act75), the control unit 100 executes the processing in Act77 and the following actions without performing the processing in Act76.

As described above, the self-checkout POS terminal 1 is configured such that the control unit 100 unlocks the corresponding electromagnetic lock and brings the respective doors into the opened state by the attendant operating the unlocking key displayed on the display unit 22 in the unlocking mode. The attendant opens the doors and executes error processing on elements accommodated in the accommodation unit. Both the first electromagnetic lock 30 and the second electromagnetic lock 31 are brought into the opened state, and the first door 441 and the money bar drawer 33 are brought into the opened state by the attendant operating the replenishment key 214 displayed on the display unit 22. The attendant extracts a money bar of the displayed money type from the money bar drawer 33 opened and replenishes the coin change machine 34 with the coins.

Next, description will be given of the error processing in Act32. FIGS. 15 to 24 are flowcharts illustrating a flow for control of the error processing in the self-checkout POS terminal 1 and diagrams illustrating display examples of related display screens. The control unit 100 determines the error state and the presence of the shortage state in each element, which will be described later, in accordance with an output from each error detection sensor.

Figure 15:
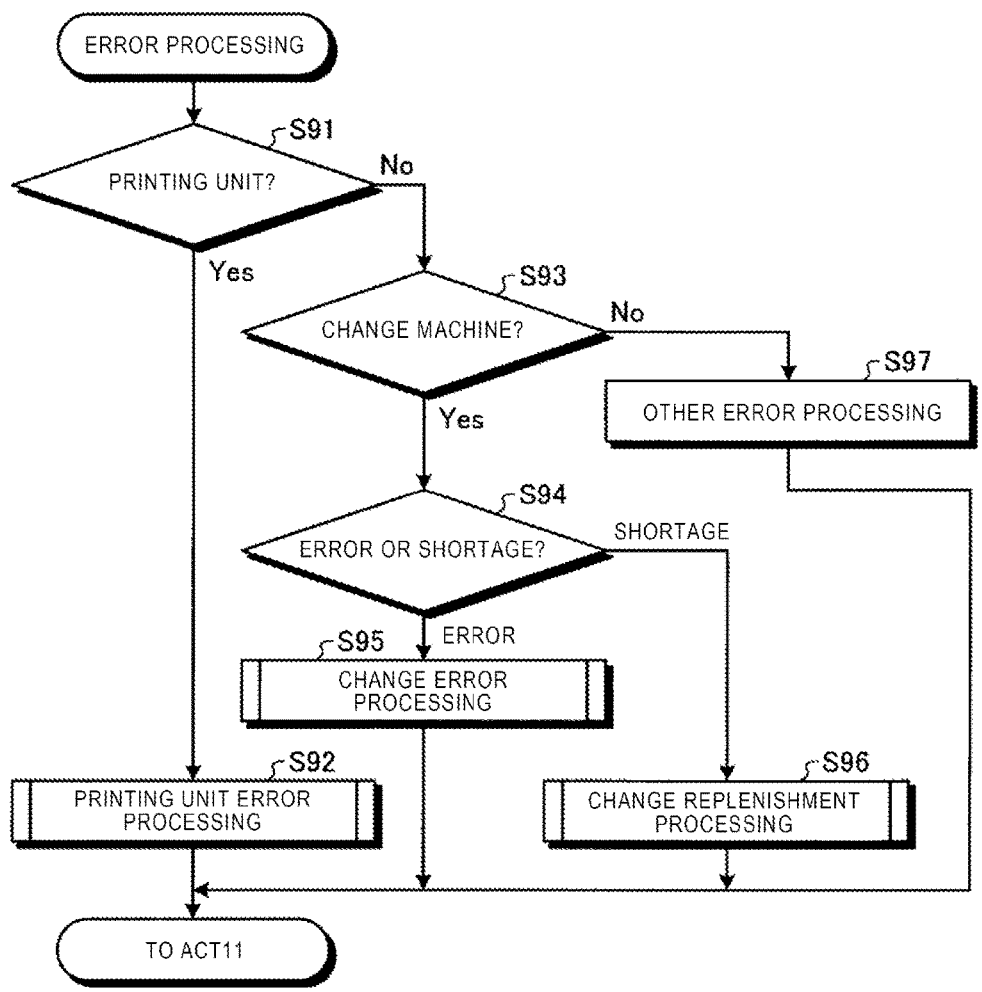
FIG. 15 is a flowchart illustrating a flow for control of error processing in the self-checkout POS terminal.

As illustrated in FIG. 15, the control unit 100 determines whether or not an error or a shortage state occurred in the printing unit 24 first (Act91). If it is determined that an error or a shortage state occurred in the printing unit 24 (Yes in Act91), the control unit 100 executes error processing or shortage state processing on the printing unit 24 (Act92). Then, the control unit 100 returns to Act11.

If it is determined that an error state or a shortage state did not occur in the printing unit 24 (No in Act91), then the control unit 100 determines whether or not an error state or a coin shortage state occurred in the change machine 27 (Act93). The error state in the change machine 27 means clogging of coins or bills in the course of being transported, for example. The shortage state in the coin change machine 34 means a state where the number of coins accommodated in the accommodation unit is short with respect to a predetermined number, for example.

If it is determined that an error state or a shortage state occurred in the change machine 27 (Yes in Act93), the control unit 100 determines which of the error state and the shortage state occurred (Act94). If it is determined that the error state occurred (error in Act94), the control unit 100 executes change error processing (Act95). Then, the control unit 100 returns to Act11. If it is determined that the shortage state occurred (shortage in Act94), the control unit 100 executes change replenishment processing (Act96). Then, the control unit 100 returns to Act11.

If it is determined that both the error state and the coin shortage state did not occur in the change machine 27, the control unit 100 executes error processing for an element other than the printing unit 24 and the change machine 27 (Act97). Then, the control unit 100 returns to Act11.

Figure 16:
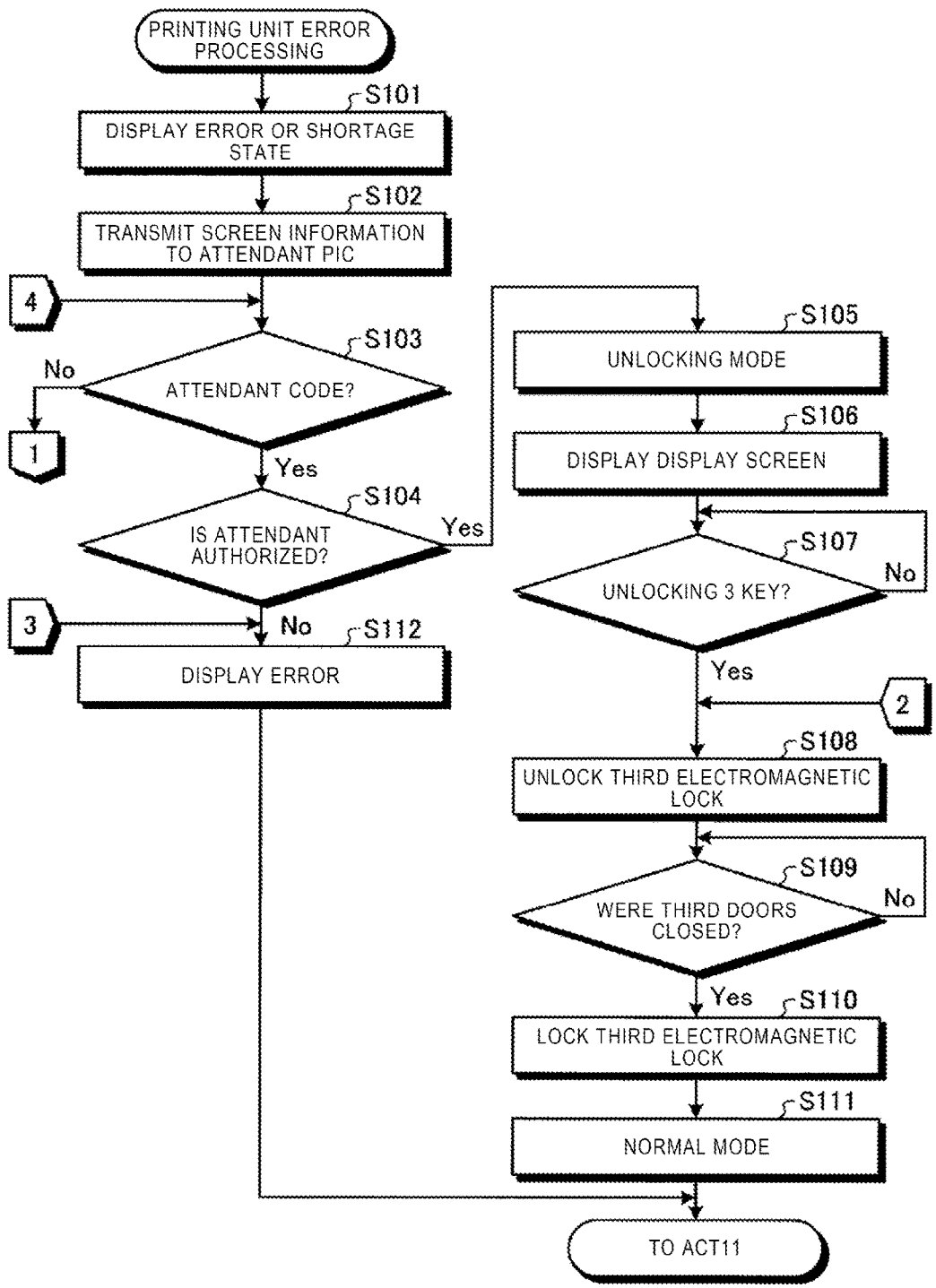
FIG. 16 is a flowchart illustrating a flow for control of error processing in a printing unit in the self-checkout POS terminal.
Figure 17:
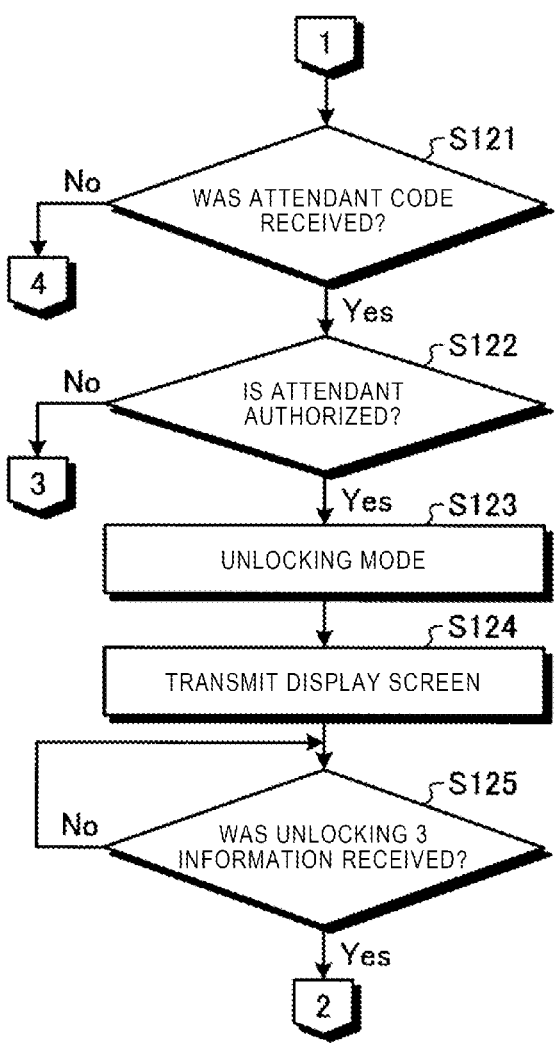
FIG. 17 is a flowchart illustrating a flow for control of error processing in the printing unit in the self-checkout POS terminal.

Next, description will be given of the printing unit error processing in Act92. FIGS. 16 and 17 are flowcharts illustrating a flow for control of the error processing performed on the printing unit 24 in the self-checkout POS terminal 1. As illustrated in FIG. 16, the control unit 100 displays the error state or the shortage state occurring in the printing unit 24 on the display unit 22 (Act101). Then, the control unit 100 transmits screen information to be displayed on the display unit 22 to the attendant PC 2 (Act102).

Then, the control unit 100 determines whether or not an attendant code was input from the reading unit 23 (Act103). If it is determined that the attendant code was input (Yes in Act103), it is determined that the attendant with the input attendant code is authorized to unlock the self-checkout POS terminal 1 (Act104). If it is determined that the attendant with the input attendant code is authorized (Yes in Act104), the control unit 100 switches the self-checkout POS terminal 1 to the unlocking mode (Act105). Then, the control unit 100 displays the unlocking 3 key 213 on the display unit 22

(Act106). At this time, the other unlocking keys and the replenishment key 214 are not displayed.

Figure 18:
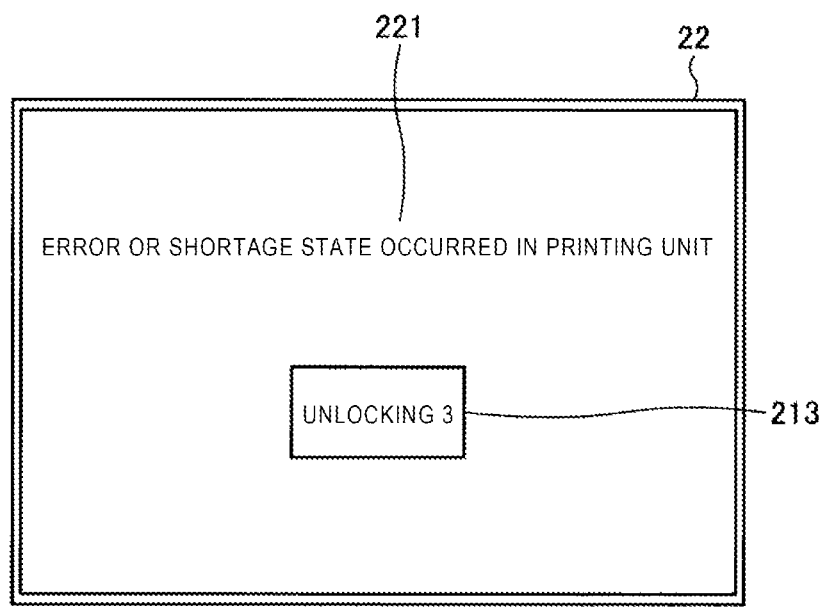
FIG. 18 is a diagram illustrating an example of a display screen, which represents an error in the printing unit, on the display unit in the self-checkout POS terminal.

FIG. 18 is an example of screen information displayed on the display unit 22 in Act106. As illustrated in FIG. 18, the control unit 100 displays, on the display unit 22, a message 221 indicating that the printing unit 24 is in the error state or the shortage state and the unlocking 3 key 213. The attendant operates the unlocking 3 key 213.

Next, the control unit 100 determines whether or not the attendant operated the unlocking 3 key 213 (Act107). The control unit 100 waits for the operation (No in Act107), and if it is determined that the attendant operated the unlocking 3 key 213 (Yes in Act107), then the control unit 100 brings the third electromagnetic lock 32 into the unlocked state (Act108). The attendant opens the third doors 421 in this state and solves the error in the printing unit 24. Then, the attendant closes the third doors 421.

Next, the control unit 100 determines whether or not the third doors 421 were brought into the closed state (Act109). The control unit 100 waits for the closed state (No in Act109), and if it is determined that the third doors 421 were brought into the closed state (Yes in Act109), then the control unit 100 brings the third electromagnetic lock 32 into the locked state (S110). Then, the control unit 100 switches the self-checkout POS terminal 1 to the normal mode (Act111). Then, the control unit 100 returns to Act11.

In contrast, if it is determined that the attendant with the input attendant code is not authorized to unlock the self-checkout POS terminal 1 in Act104 (No in Act104), the control unit 100 displays, on the display unit 22, an error message indicating that the attendant with the attendant code is not authorized to unlock the self-checkout POS terminal 1 (Act112). Then, the control unit 100 returns to Act11.

If it is determined in Act103 that the attendant code was not input from the reading unit 23 (No in Act103), the control unit 100 determines whether or not an attendant code was received from the attendant PC 2 as illustrated in FIG. 17 (Act121). If it is determined that the attendant code was not received (No in Act121), the control unit 100 returns to Act103. If it is determined that the attendant code was received (Yes in Act121), the control unit 100 determines whether or not the attendant with the received attendant code is authorized to unlock the self-checkout POS terminal 1 (Act122). If it is determined that the attendant is authorized (Yes in Act122), the control unit 100 switches the self-checkout POS terminal 1 to the unlocking mode (Act123).

Then, the control unit 100 transmits, to the attendant PC2, the screen information of the unlocking 3 key 213 displayed on the display unit 22 in Act106 (Act124). Then, the control unit 100 determines whether or not unlocking 3 information indicating that the attendant operated the unlocking 3 key 3073 displayed on the display unit 308 of the mobile attendant PC 3 was received from the attendant PC 2 (Act125). The control unit waits for the reception (No in Act125), and if the unlocking 3 information was received (Yes in Act125), the control unit 100 executes the processing in Act 108 and the following actions. If it is determined in Act122 that the attendant with the received attendant code is not authorized to unlock the self-checkout POS terminal 1 (No in Act122), the control unit 100 executes the processing in Act112.

Figure 19:
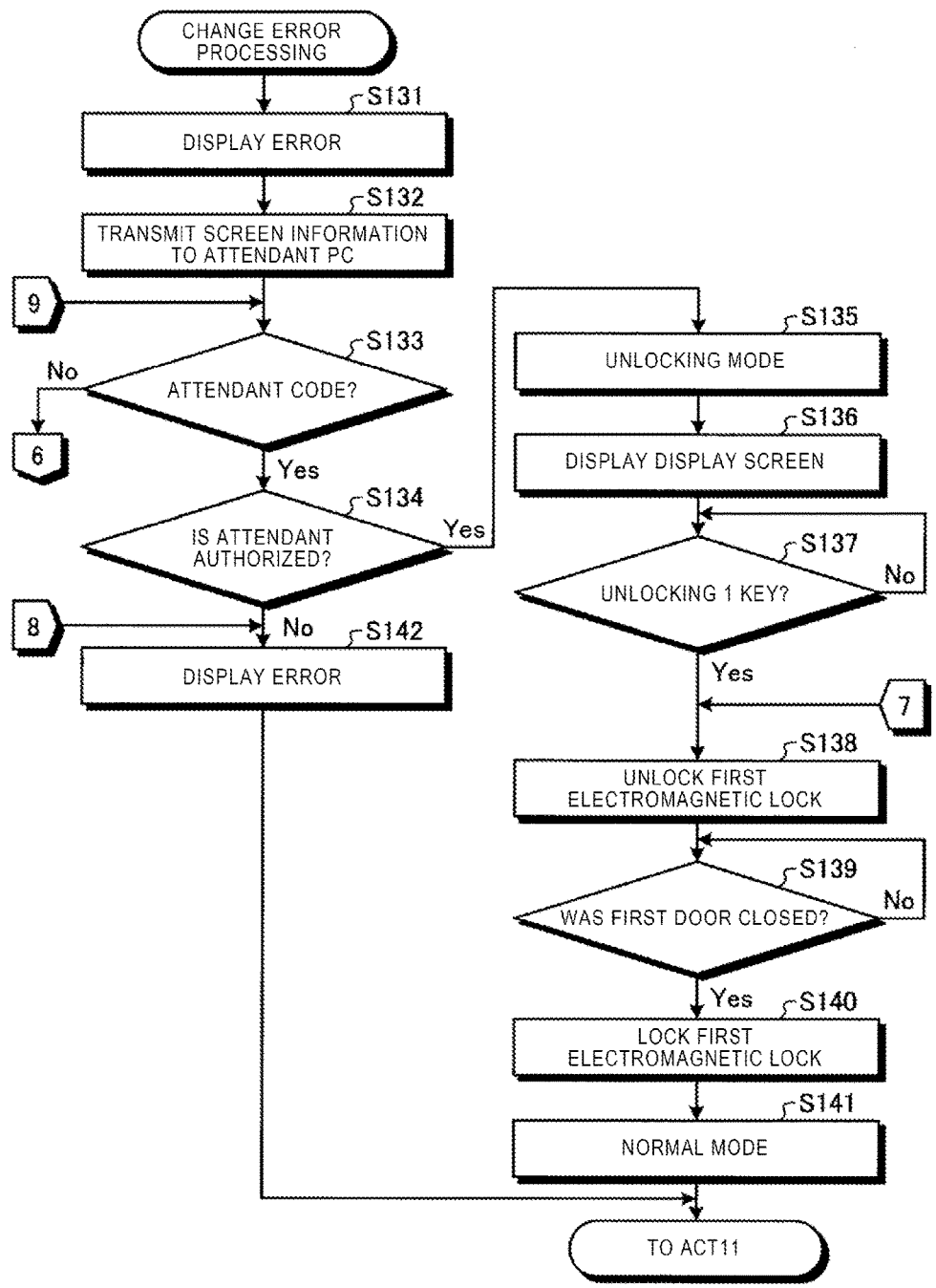
FIG. 19 is a flowchart illustrating a flow for control of error processing in a change machine in the self-checkout POS terminal.
Figure 20:
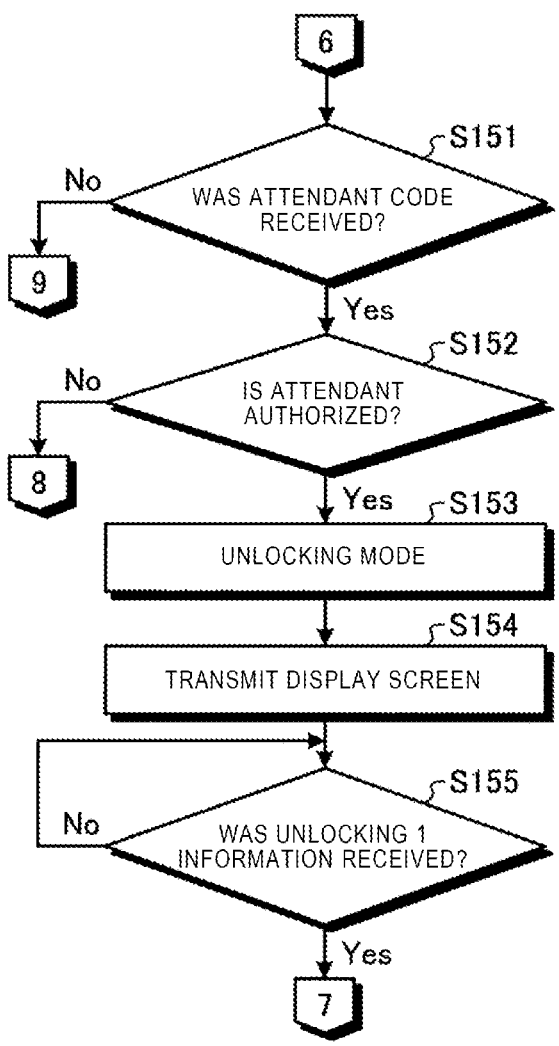
FIG. 20 is a flowchart illustrating a flow for control of error processing in the change machine in the self-checkout POS terminal.

Next, description will be given of the change error processing in Act95. FIGS. 19 and 20 are flowcharts illustrating a flow for control of the change machine error processing in the self-checkout POS terminal 1. As illustrated in FIG. 19, the control unit 100 displays the error state occurring in the change machine 27 on the display unit 22 (Act131). Then, the control unit 100 transmits screen information to be displayed on the display unit 22 to the attendant PC 2 (Act132).

Next, the control unit 100 determines whether or not an attendant code was input from the reading unit 23 (Act133). If it is determined that the attendant code was input (Yes in Act133), it is determined whether or not the attendant with the input attendant code is authorized to unlock the self-checkout POS terminal 1 (Act134). If it is determined that the attendant is authorized (Yes in Act134), the control unit 100 switches the self-checkout POS terminal 1 to the unlocking mode (Act135). Then, the control unit 100 displays the unlocking 1 key 211 on the display unit 22 (Act136). At this time, the other unlocking keys and the replenishment key 214 are not displayed.

Figure 21:
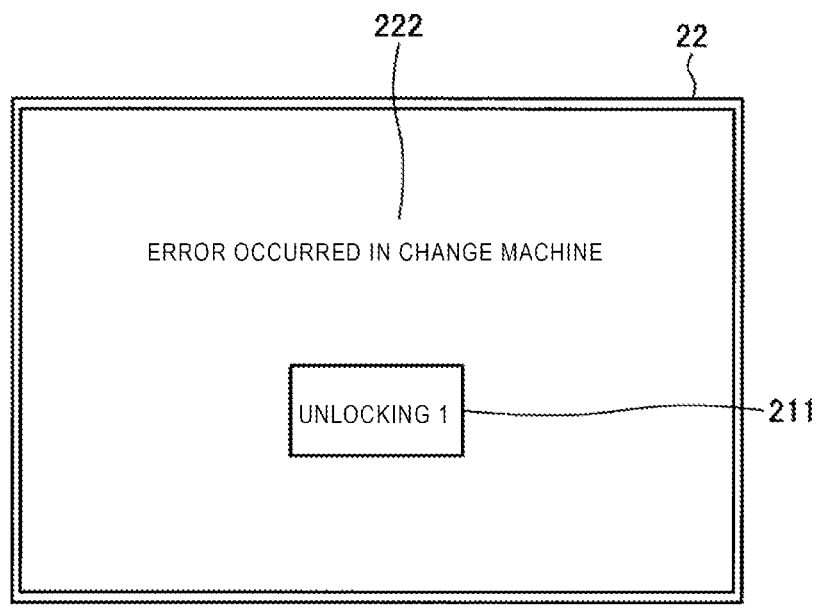
FIG. 21 is a diagram illustrating an example of a display screen, which represents an error in the change machine, on the display unit in the self-checkout POS terminal.

FIG. 21 is an example of the screen information displayed on the display unit 22 in Act136. As illustrated in FIG. 21, the control unit 100 displays, on the display unit 22, a message 222 indicating that the change machine 27 is in the error state and the unlocking 1 key 211. The attendant operates the unlocking 1 key 211.

Next, the control unit 100 determines whether or not the attendant operated the unlocking 1 key 211 (At137). The control unit 100 waits for the operation (No in Act137), and if it is determined that the attendant operated the unlocking 1 key 211 (Yes in Act137), the control unit 100 brings the first electromagnetic lock 30 into the unlocked state (Act138). The attendant opens the first door 411 and the second door 412 in this state and solves the error in the change machine 27. Then, the attendant closes the second door 412 and the first door 411 in this order.

Next, the control unit 100 determines whether or not the first door 411 was brought into the closed state (Act139). The control unit 100 waits for the closed state (No in Act139), then if it is determined that the first door 411 was brought into the closed state (Yes in Act139), the control unit 100 brings the first electromagnetic lock 30 into the locked state (Act140). Then, the control unit 100 switches the self-checkout POS terminal 1 to the normal mode (Act141). Then, the control unit 100 returns to Act11.

In contrast, if it is determined in Act134 that the attendant with the input attendant code is not authorized to unlock the self-checkout POS terminal 1 (No in Act134), the control unit 100 displays, on the display unit 22, an error message indicating that the attendant with the attendant code is not authorized to unlock the self-checkout POS terminal 1 (Act142). Then, the control unit 100 returns to Act11.

If it is determined in Act133 that no attendant code was input from the reading unit 23 (No in Act133), the control unit 100 determines whether or not an attendant code was received from the attendant PC 2 as illustrated in FIG. 20 (Act151). If it is determined that no attendant code was received (No in Act151), the control unit 100 returns to Act133. If it is determined that an attendant code was received (Yes in Act151), the control unit 100 determines whether or not the attendant with the received attendant code is authorized to unlock the self-checkout POS terminal 1 (Act152). If it is determined that the attendant is authorized (Yes in Act152), the control unit 100 switches the self-checkout POS terminal 1 to the unlocking mode (Act153).

Then, the control unit 100 transmits, to the attendant PC2, the screen information of the unlocking 1 key 211 displayed on the display unit 22 in Act136 (Act154). Then, the control unit 100 determines whether or not the unlocking 1 information indicating that the attendant operated the unlocking 1 key 3071 displayed on the display unit 308 of the mobile attendant PC 3 was received from the attendant PC 2

(Act155). The control unit 100 waits for the reception (No in Act155), and if it is determined that the unlocking 1 information was received (Yes in Act155), then the control unit 100 executes the processing in Act138 and the following actions. If it is determined in Act152 that the attendant with the received attendant code is not authorized to unlock the self-checkout POS terminal 1 (No in Act152), the control unit 100 executes the processing in Act142.

Figure 22:
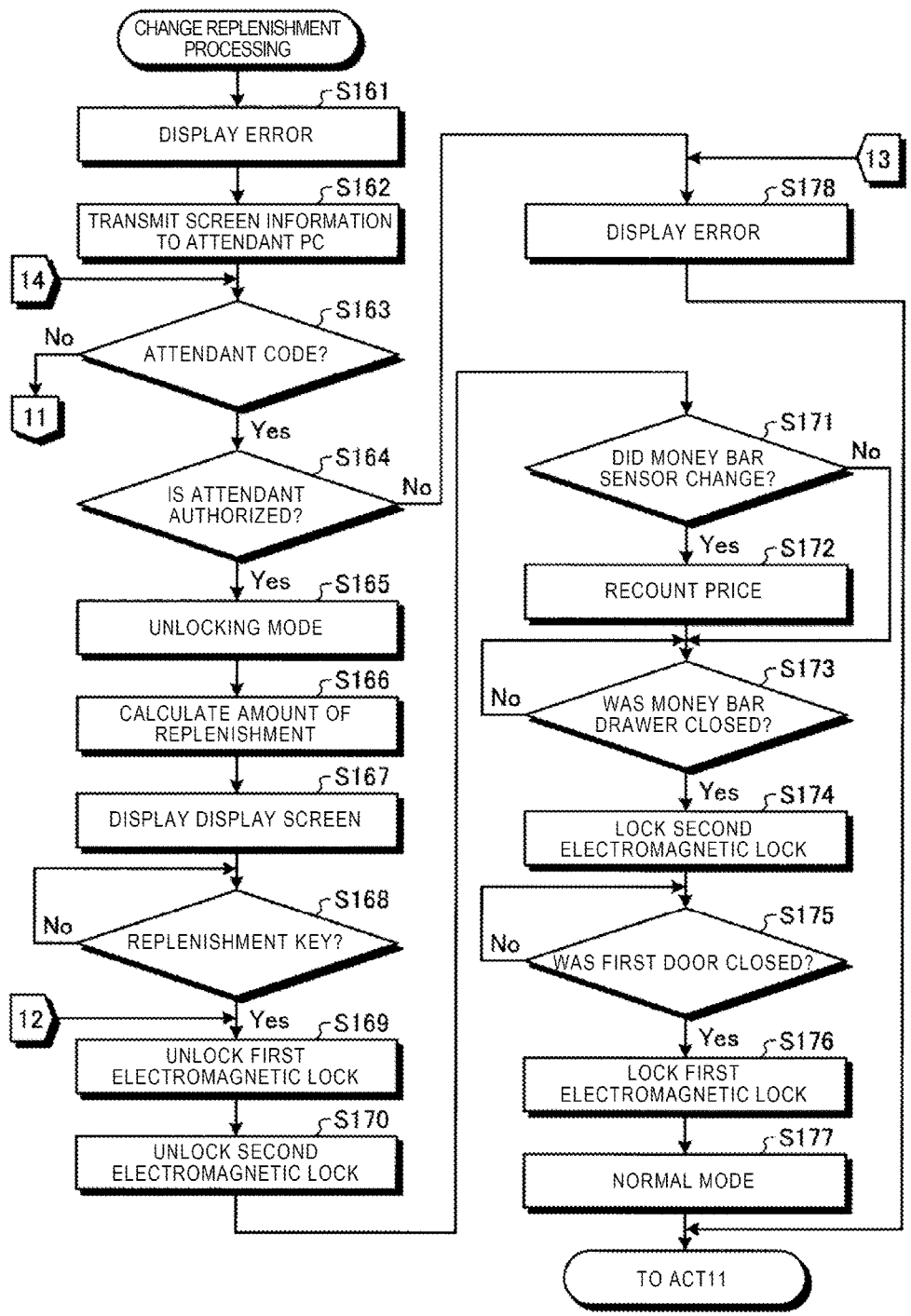
FIG. 22 is a flowchart illustrating a flow for control of change replenishment processing for the change machine in the self-checkout POS terminal.
Figure 23:
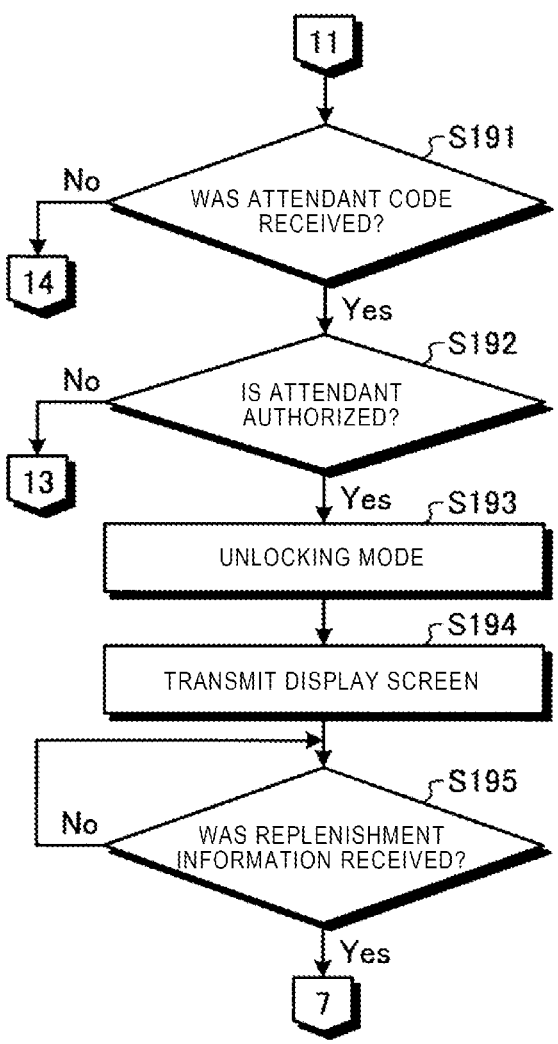
FIG. 23 is a flowchart illustrating a flow for control of the change replenishment processing for the change machine in the self-checkout POS terminal.

Next, description will be given of the change replenishment processing in Act96. FIGS. 22 and 23 are flowcharts illustrating a flow for control of the change replenishment processing in the self-checkout POS terminal 1. As illustrated in FIG. 22, the control unit 100 displays a change shortage state occurring in the coin change machine 34 on the display unit 22 (Act161). Then, the control unit 100 transmits screen information to be displayed on the display unit 22 to the attendant PC 2 (Act162).

Then, the control unit 100 determines whether or not an attendant code was input from the reading unit 23 (Act163). If it is determined that the attendant code was input (Yes in Act163), it is determined that the attendant with the input attendant code is authorized to unlock the self-checkout POS terminal 1 (Act164). If it is determined that the attendant is authorized (Yes in Act164), the control unit 100 switches the self-checkout POS terminal 1 to the unlocking mode (Act165).

Next, the control unit 100 calculates the number of coins (the number of money bars) for replenishment in relation to the coins of the money type that was detected to be short by the sensor of the coin change machine 34 (Act166). Then, the control unit 100 (replenishment key display section 102) displays the replenishment key 214 on the display unit 22 (Act167).

Figure 24:
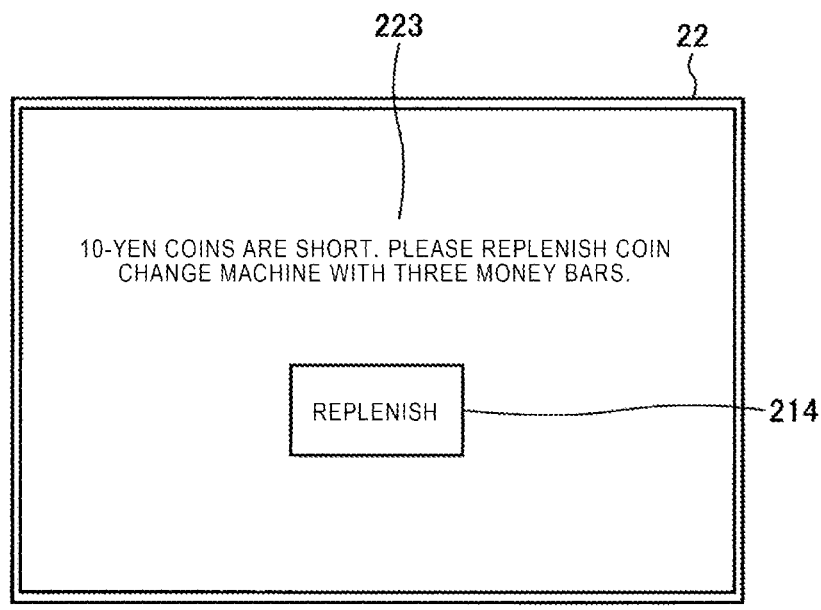
FIG. 24 is a diagram illustrating an example of a display screen, which represents a shortage state of the change machine, on the display unit in the self-checkout POS terminal.

FIG. 24 is an example of the display screen displayed on the display unit 22 in Act167. As illustrated in FIG. 24, the control unit 100 displays, on the display unit 22, a message 223 indicating that 10-yen coins are short and the coin change machine 34 is to be replenished with three money bars of 10-yen coins. The control unit 100 displays the replenishment key 214 on the display unit 22. The attendant operates the replenishment key 214.

Next, the control unit 100 determines whether or not the attendant operated the replenishment key 214 (Act168). The control unit 100 waits for the operation (No in Act168), and if it is determined that the replenishment key 214 was operated (Yes in Act168), the control unit 100 brings the first electromagnetic lock 30 into the unlocked state (Act169). Subsequently or at the same time, the control unit 100 brings the second electromagnetic lock 31 into the unlocked state (Act170). The attendant opens the first door 411 and the second door 412 in this state, further brings the money bar drawer 33 into the opened state, extracts three money bars of 10-yen coins from the money bar drawer 33, and replenishes the coin change machine 34 with the coins.

The control unit 100 determines whether or not the money bar sensor 336 and the money bar sensor 337 detected that the money bar was extracted from the money bar drawer 33 (Act171). If it is determined that the money bar sensor 336 and the money bar sensor 337 detected that the money bar was extracted (Yes in Act171), the control unit 100 recalculates the number of money bars of 10-yen coins in the money bar drawer 33, which is stored in the money bar unit 143, by subtracting the number of money bars by 3 based on outputs from the money bar sensor 336 and the money bar sensor 337 (Act172). At this time, the control unit 100 also recalculates the total price of the coins stocked in the money bar drawer 33, which is stored in the money bar unit 143 (Act172). The control unit 100 counts one hundred fifty 10-yen coins with which the coin change machine 34 was replenished and recalculates the numerical value in the collected money unit 142 (Act172). If it is determined that the money bar sensor 336 and the money bar sensor 337 did not detect that the money bar was extracted (No in Act171), the control unit 100 executes the processing in Act173 and the following actions.

Next, the attendant closes the money bar drawer 33, the second door 412, and the first door 411 in this order. Then, the control unit 100 determines whether or not the money bar drawer 33 was brought into the closed state (Act173). The control unit 100 waits for the closed state (No in Act173), and if it is determined that the money bar drawer 33 was brought into the closed state (Yes in Act173), the control unit 100 brings the second electromagnetic lock 31 into the locked state (Act174).

Next, the control unit 100 determines whether or not the first door 411 was brought into the closed state (Act175). The control unit 100 waits for the closed state (No in Act175), and if it is determined that the first door 411 was brought into the closed state (Yes in Act175), the control unit 100 brings the first electromagnetic lock 30 into the locked state (Act176). Then, the control unit 100 switches the self-checkout POS terminal 1 to the normal mode (Act177). Then, the control unit 100 returns to Act11.

In contrast, if it is determined in Act164 that the attendant with the input attendant code is not authorized to unlock the self-checkout POS terminal 1 (No in Act164), the control unit 100 displays, on the display unit 22, an error message indicating that the attendant with the attendant code is not authorized to unlock the self-checkout POS terminal 1 (Act178). Then, the control unit 100 returns to Act11.

If it is determined in Act163 that no attendant code was input from the reading unit 23 (No in Act163), the control unit 100 determines whether or not an attendant code was received from the attendant PC 2 as illustrated in FIG. 23 (Act191). If it is determined that no attendant code was received (No in Act191), the control unit 100 returns to Act163. If it is determined that an attendant code was received (Yes in Act191), the control unit 100 determines whether or not the attendant with the received attendant code is authorized to unlock the self-checkout POS terminal 1 (Act192). If it is determined that the attendant is authorized (Yes in Act192), the control unit 100 switches the self-checkout POS terminal 1 to the unlocking mode (Act193).

Then, the control unit 100 (transmission section 104) transmits the screen information of the replenishment key 214 displayed on the display unit 22 in Act167 to the attendant PC 2 in order to cause the mobile attendant PC 3 to display the screen information (Act194). Next, the control unit 100 determines whether or not replenishment information indicating that the attendant operated the replenishment key 3074 displayed on the display unit 308 of the mobile attendant PC 3 was received from the attendant PC 2 (Act195). The control unit waits for the reception (No in Act195), and if it is determined that the replenishment information was received (Yes in Act195), the control unit 100 executes the processing in Act169 and the following actions. If it is determined in Act192 that the attendant with the received attendant code is not authorized to unlock the self-checkout POS terminal 1 (No in Act192), the control unit 100 executes the processing in Act178.

Figure 25:
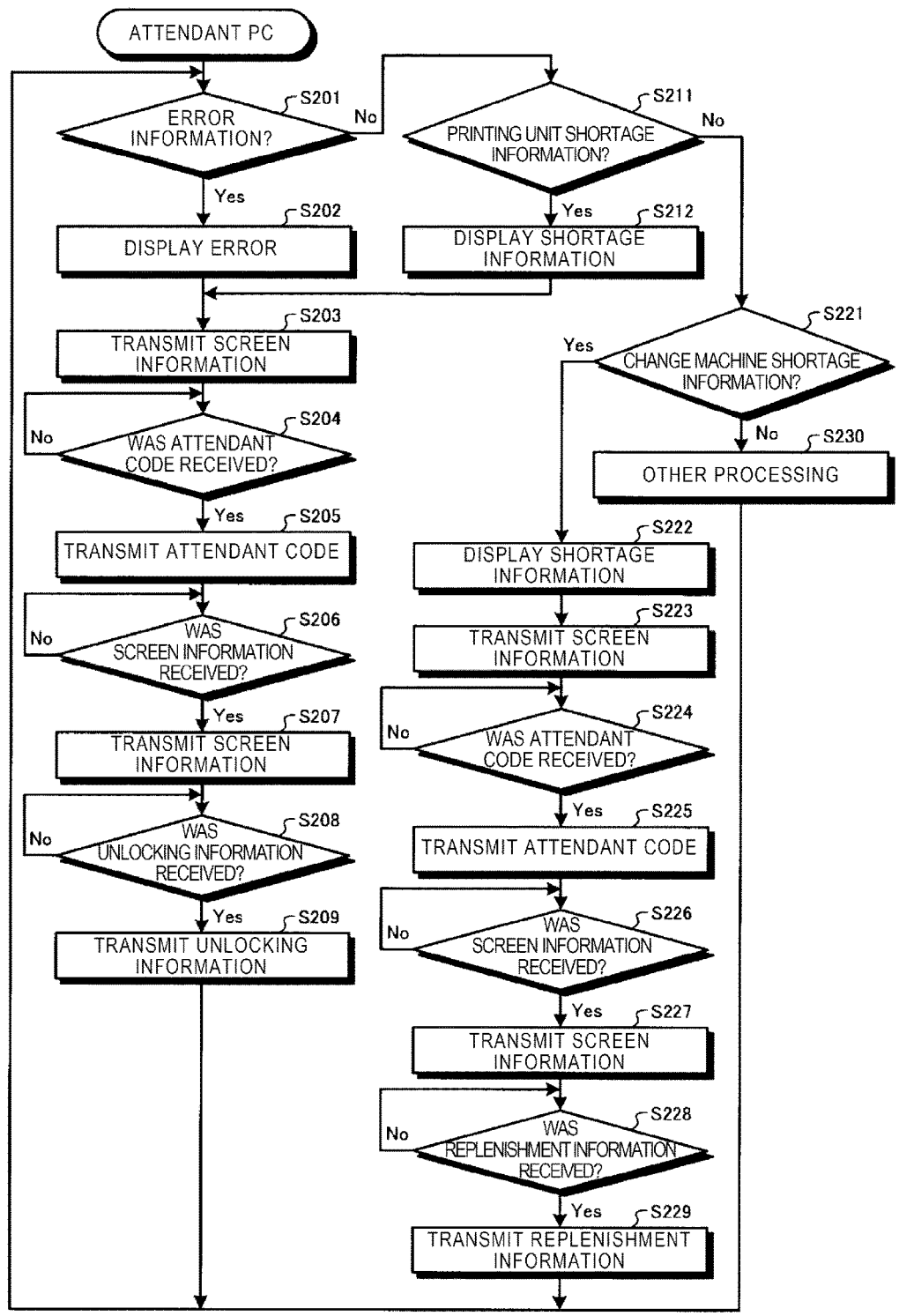
FIG. 25 is a flowchart illustrating a flow for control processing in the attendant PC.

Hereinafter, description will be given of control processing in the attendant PC 2 and the mobile attendant PC 3. FIG. 25 is a flowchart illustrating a flow for control processing in the attendant PC 2. As illustrated in FIG. 25, the control unit 200 determines whether or not screen information of displaying error information was received from the self-checkout POS terminal 1 (Act201). If it is determined that the screen information was received (Yes in Act201), the control unit 200 displays the received screen information including the error information on the display unit 208 (Act202). Then, the control unit 200 transmits the received screen information to the mobile attendant PC 3 (Act203).

Next, the control unit 200 determines whether or not an attendant code was received from the mobile attendant PC 3 in response to the transmitted screen information (Act204). The control unit 200 waits for the reception (No in Act204), and if it is determined that an attendant code was received (Yes in Act204), the control unit 200 transmits the attendant code to the self-checkout POS terminal 1 (Act205).

Then, the control unit 200 determines whether or not screen information including the unlocking key corresponding to the concerned error was received from the self-checkout POS terminal 1 (Act206). The control unit 200 waits for the reception (No in Act206), and if it is determined that the screen information was received (Yes in Act206), the control unit 200 transmits the received screen information to the mobile attendant PC 3 (Act207).

Next, the control unit 200 determines whether or not operation information indicating that the attendant operated the unlocking key was received from the mobile attendant PC 3 to which the screen information was transmitted (Act208). The control unit 200 waits for the reception (No in Act208), and if it is determined that the operation information was received (Yes in Act208), the control unit 200 transmits the received operation information to the self-checkout POS terminal 1 (Act209). Then, the control unit 200 returns to Act201.

In contrast, if it is determined in Act201 that screen information of displaying the error information was not received from the self-checkout POS terminal 1 (No in Act201), the control unit 200 determines whether or not screen information of displaying shortage information in the printing unit 24 was received from the self-checkout POS terminal 1 (Act211). If it is determined that the screen information was received (Yes in Act211), the control unit 200 displays the received screen information including the shortage information on the display unit 208 (Act212). Then, the control unit 200 executes the processing in Act203 and the following actions.

If it is determined that the screen information of displaying the shortage information in the printing unit 24 was not received (No in Act211), the control unit 200 determines whether or not screen information of displaying coin shortage information in the coin change machine 34 was received from the self-checkout POS terminal 1 (Act221). If it is determined that the screen information was received (Yes in Act221), the control unit 200 displays the received screen information including the shortage information on the display unit 208 (Act222). Then, the control unit 200 transmits the received screen information to the mobile attendant PC 3 (Act223).

Next, the control unit 200 determines whether or not an attendant code was received from the mobile attendant PC 3 in response to the transmitted screen information (Act224). The control unit 200 waits for the reception (No in Act224), and if it is determined that an attendant code was received (Yes in Act224), the control unit 200 transmits the attendant code to the self-checkout POS terminal 1 (Act225).

Next, the control unit 200 determines whether or not screen information including the replenishment key 214 corresponding to the shortage information was received from the self-checkout POS terminal 1 (Act226). The control unit 200 waits for the reception (No in Act226), and if it is determined that the screen information was received (Yes in Act226), the control unit 200 transmits the received screen information to the mobile attendant PC 3 (Act227).

Next, the control unit 200 determines whether or not operation information indicating that the attendant operated the replenishment key 3074 displayed on the display unit 308 of the mobile attendant PC 3 was received from the mobile attendant PC 3 to which the screen information was transmitted (Act228). The control unit 200 waits for the reception (No in Act228), and if it is determined that the operation information was received (Yes in Act228), the control unit 200 transmits the received operation information to the self-checkout POS terminal 1 (Act229). Then, the control unit 200 returns to Act201.

If it is determined that the screen information indicating the coin shortage information in the coin change machine 34 was not received from the self-checkout POS terminal 1 (NO in Act221), the control unit 200 executes other processing (Act230). Then, the control unit 200 returns to Act201.

Figure 26:
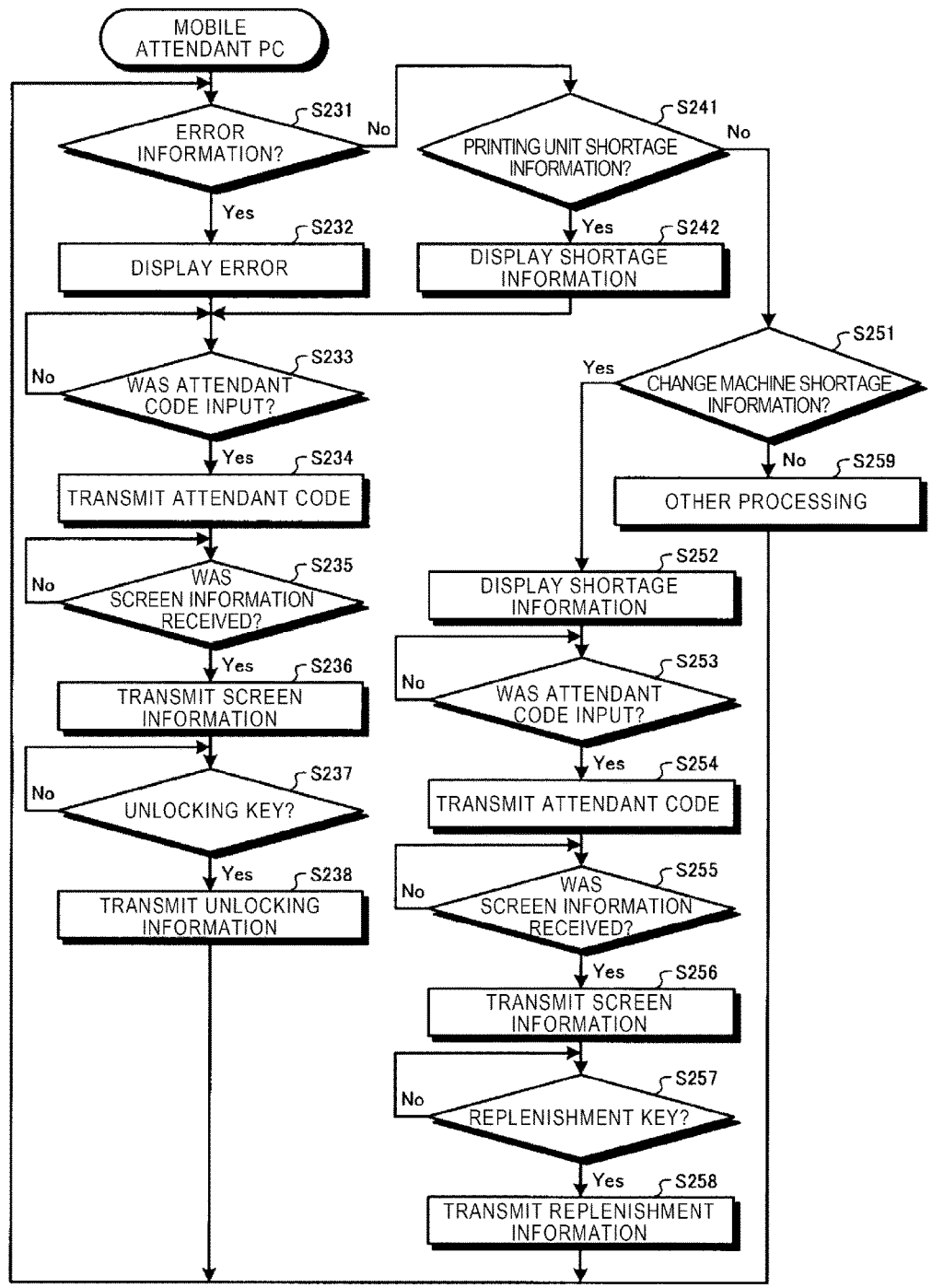
FIG. 26 is a flowchart illustrating a flow for control processing in the mobile attendant PC.

FIG. 26 is a flowchart illustrating a flow for control processing in the mobile attendant PC 3. As illustrated in FIG. 26, the control unit 300 determines whether or not screen information of displaying error information was received from the attendant PC 2 (Act231). If it is determined that the screen information was received (Yes in Act231), the control unit 300 displays the received screen information including the error information on the display unit 308 (Act232).

Next, the control unit 300 determines whether or not an attendant code was input from the reading unit 309 in response to the displayed screen information (Act233). The control unit 300 waits for the input (No in Act233), and if it is determined that an attendant code was input (Yes in Act233), the control unit 300 transmits the attendant code to the attendant PC 2 (Act234).

Next, the control unit 300 determines whether or not screen information including the unlocking key corresponding to the concerned error was received from the attendant PC 2 (Act235). The control unit 300 waits for the reception (No in Act235), and if it is determined that the screen information was received (Yes in Act235), then the control unit 300 displays the received screen information on the display unit 308 (Act236).

Next, the control unit 300 determines whether or not the attendant operated the unlocking key included in the screen information displayed on the display unit 308 (Act237). The control unit 300 waits for the operation (No in Act237), and if it is determined that the attendant operated the unlocking key (Yes in Act237), the control unit 300 transmits the operation information of the operated unlocking key to the attendant PC 2 (Act238). Then, the control unit 300 returns to Act231.

In contrast, if it is determined in Act231 that the screen information of displaying the error information was not received from the attendant PC 2 (No in Act231), the control unit 300 determines whether or not screen information of displaying shortage information in the printing unit 24 was received from the attendant PC 2 (Act241). If it is determined that the screen information was received (Yes in Act241), the control unit 300 displays the received screen information including the shortage information on the display unit 308 (Act242). Then, the control unit 300 executes the processing in Act233 and the following actions.

If it is determined that the screen information of displaying the shortage information in the printing unit 24 was not received from the attendant PC 2 (No in Act241), then the control unit 300 determines whether or not screen information of displaying coin shortage information in the coin change machine 34 was received from the attendant PC 2 (Act251). If it is determined that the screen information was received (Yes in Act251), the control unit 300 displays the received screen information including the shortage information on the display unit 308 (Act252).

Next, the control unit 300 determines whether or not the attendant input the attendant code from the reading unit 309 in response to the displayed screen information (Act253). The control unit 300 waits for the reception (No in Act253), and if it is determined that the input was received (Yes in Act253), the control unit 300 transmits the attendant code to the attendant PC 2 (Act254).

Next, the control unit 300 determines whether or not screen information including the replenishment key 3074 corresponding to the shortage information was received from the attendant PC 2 (Act255). The control unit 300 waits for the reception (No in Act255), and if it is determined that the screen information was received (Yes in Act255), the control unit 300 displays the received screen information on the display unit 308 (Act256).

Next, the control unit 300 determines whether or not the attendant operated the replenishment key 3074 displayed on the display unit 308 (Act257). The control unit 300 waits for the operation (No in Act257), and if it is determined that the attendant operated the replenishment key 3074 (Yes in Act257), the control unit 300 transmits operation information indicating that the attendant operated the replenishment key 3074 to the attendant PC 2 (Act258). Then, the control unit 300 returns to Act231.

If it is determined that the screen information of displaying the coin shortage information in the coin change machine 34 was not received from the attendant PC 2 (No in Act251), the control unit 300 executes other processing (Act259). Then, the control unit 300 returns to Act231.

According to the self-checkout POS terminal 1 of such an embodiment, the first door 411 is in the closed state by bringing the first electromagnetic lock 30 into the locked state if the self-checkout POS terminal 1 is in the normal mode. The first door 411 is brought into the opened state by bringing the first electromagnetic lock 30 into the unlocked state if the self-checkout POS terminal 1 is in the unlocking mode. Therefore, according to the self-checkout POS terminal 1, the customer is blocked by the closed first door 411 and cannot touch the money bar drawer 33 in the normal mode. The attendant can replenish the coin change machine 34 with coins from the money bar drawer 33 in the unlocking mode. Therefore, it is possible to provide the money bar drawer 33 in the self-checkout POS terminal 1 while securing security.

Since the unlocking key for unlocking both the first electromagnetic lock 30 and the second electromagnetic lock 31 and the replenishment key 214 are displayed in the unlocking mode according to the embodiment, it is possible to provide the money bar drawer 33 in the self-checkout POS terminal 1 while securing security.

Although the exemplary embodiment was described above, the embodiment was described for the illustrative purpose and was not intended to limit the scope of the disclosure. Such a novel embodiment can be performed in other various forms, and various omissions, replacements, and amendments can be made without departing from the gist of the disclosure. The embodiment and modifications thereof are included in the scope and the gist of the disclosure and are also included in the scope of the disclosure in claims and equivalents thereof.

Although the money bar drawer 33 for stocking coins to replenish the coin change machine 34 was described as the stocking unit in the embodiment, the disclosure is not limited thereto, and the stocking unit may have another configuration for replenishing the bill change machine 35 with bills.

Although the printing unit 24 and the change machine 27 were exemplified as devices where an error occurred in the embodiment, the disclosure is not limited thereto, and an error may occur in an element other than the printing unit 24.

Although the second door 412 is opened and closed along with the first door 411 in the embodiment, the second door 412 is not an essential requirement.

Although the second electromagnetic lock 31 for opening and closing the money bar drawer 33 is provided in addition to the first electromagnetic lock 30 for opening and closing the first door in the embodiment, the disclosure is not limited thereto, and the second electromagnetic lock is not an essential requirement.

Although the change machine 27 and the money bar drawer 33 are provided in the accommodation unit 37 of the first case body 41 and the printing unit 24 and the card unit 28 are provided in the accommodation unit 38 of the second case body 42 in the embodiment, the disclosure is not limited thereto, and all the elements may be provided in an accommodation unit in the same case body.

Although the merchandise was exemplified as the sales target in the embodiment, the sales target may be a service, for example.

Figure 27:
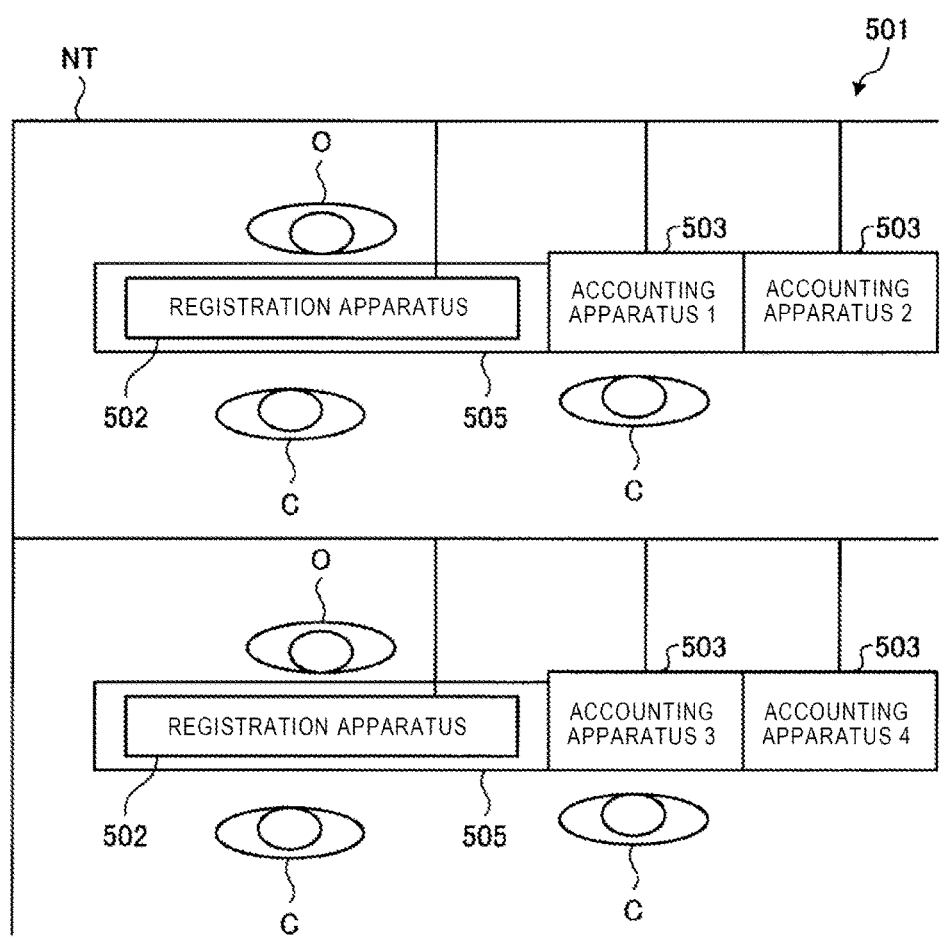
FIG. 27 is a diagram schematically illustrating a semi-self-checkout system according to a modification example of the embodiment.

Although the self-checkout POS terminal 1 was described as the accounting apparatus in the embodiment, the disclosure is not limited thereto, and the accounting apparatus may be an accounting apparatus in a semi-self-checkout system provided with a registration apparatus and the accounting apparatus. FIG. 27 is a diagram schematically illustrating a semi-self-checkout system according to a modification example of the embodiment. As illustrated in FIG. 27, a checkout system 501 includes a registration apparatus 502 operated by an operator O who is a store worker and an accounting apparatus 503 operated by a customer C themselves.

The registration apparatus 502 is installed on a work platform 505 with a horizontally long table shape. Each registration apparatus 502 and each accounting apparatus 503 are electrically connected to each other via a network NT such as a Local Area Network (LAN).

Two accounting apparatuses 503 are provided with respect to one registration apparatus 502. In the example illustrated in FIG. 27, two accounting apparatuses 503, namely an accounting apparatus 1 and an accounting apparatus 2 are connected to one registration apparatus 502. Two accounting apparatuses 503, namely an accounting apparatus 3 and an accounting apparatus 4 are connected to another registration apparatus 502. The accounting apparatus 1, the accounting apparatus 2, the accounting apparatus 3, and the accounting apparatus 4 are the accounting apparatuses 503 with the same configuration and the same function. The respective accounting apparatuses 503 are linearly installed so as to be adjacent to the work platform 505. Therefore, a path for the customer C is formed between a plurality of work platforms 505 in the modification example.

Each accounting apparatus 503 includes a change machine and a money bar drawer provided therein. The accounting apparatus 503 includes a door and an electromagnetic lock for closing the money bar drawer. The accounting apparatus 503 can be shifted between a normal mode and an unlocking mode.

According to such a checkout system 501, if the customer C places a basket with merchandise to be purchased on the work platform 505 of the registration apparatus 502, an operator executes a registration operation of extracting the merchandise from the basket and using a scanner (not illustrated) to read merchandise codes attached to the merchandise. The registration apparatus 502 reads merchandise information based on the read merchandise codes and executes sales registration processing. The registration apparatus 502 transmits the merchandise information of the merchandise after the sales registration processing to the accounting apparatus 503.

If the operator O completes the registration operation, the customer C goes to the designated accounting apparatus. The accounting apparatus 503 to which the customer C goes receives the merchandise information from the registration apparatus 502. The accounting apparatus 503 receives the merchandise information and displays the merchandise information on a display unit (not illustrated). The customer C executes an accounting operation based on the displayed merchandise information.

Since the electromagnetic lock of the accounting apparatus 503 is brought into the locked state if the accounting apparatus 503 is in the normal mode in such a modification example, the accommodation unit with a built-in money bar drawer is maintained in the closed state by the door. Therefore, the customer C cannot touch the money bar drawer. In contrast, if the accounting apparatus 503 is in the unlocking mode, the operator O can open the door, extract money bars from the money bar drawer, and replenish the change machine.

A program executed by the self-checkout POS terminal 1 according to the embodiment is provided by being recorded in a computer-readable recording medium such as a CD-ROM, a flexible disk (FD), a CD-R, or a Digital Versatile Disc (DVD) in an installable or executable format file.

The program executed by the self-checkout POS terminal 1 according to the embodiment may be stored in a computer connected to a network such as the Internet and may be provided by being downloaded via the network. The program executed by the self-checkout POS terminal 1 according to the embodiment may be provided or distributed via a network such as the Internet.

The program executed by the self-checkout POS terminal 1 according to the embodiment may be installed in a ROM or the like in advance and may be provided.

Examples of related art documents include JP-A-2013-181377.

What is claimed is:

1. An accounting apparatus comprising:
   a case body that accommodates a change machine for dispensing change and a stocking unit for stocking money to replenish the change machine;
   a first door that is provided in the case body that is openable and closable and when closed provides an accommodation unit for accommodating the stocking unit;
   a first locking mechanism that is shifted between a locked state where the first door is not openable and an unlocked state where the first door is openable;
   an opening and closing control section that maintains the first locking mechanism in the locked state in a normal mode in which accounting processing of driving the change machine to dispense change with respect to a price of a sales target is executed, and enables the first locking mechanism to be shifted to the unlocked state in a specific mode based on an input of unlocking permission information for the locking mechanism; and
   a second locking mechanism that is shifted between a locked state where the stocking unit is closed and an unlocked state where the stocking unit is openable, wherein the opening and closing control section enables the second locking mechanism to be shifted to the unlocked state in the specific mode; and,
   a third locking mechanism that is shifted between a locked state where the stocking unit is closed and an unlocked state where the stocking unit is openable, wherein the opening and closing control section enables the third locking mechanism to be shifted to the unlocked state in the specific mode.

2. The apparatus according to claim 1, further comprising: a display unit; and a replenishment key display section that displays, on the display unit, a replenishment key for providing an instruction for replenishing the change machine with money from the stocking unit.

3. The apparatus according to claim 2, further comprising:
   a detecting section that detects shortage of money in the change machine,
   wherein the replenishment key display section displays the replenishment key on a condition that the detection section detects the shortage of the money.

4. The apparatus according to claim 3, further comprising:
   a transmission section that transmits display information indicating display of the replenishment key on a mobile information processing apparatus, wherein the opening and closing control section brings the first locking mechanism and the second locking mechanism into the unlocked state on a condition that operation information in accordance with an operation of the replenishment key displayed on the information processing apparatus in response to the transmission of the display information from the transmission section is received.

5. The apparatus according to claim 2, further comprising:
   an unlocking key display section that displays, on the display unit, an unlocking key for providing an instruction for bringing the first locking mechanism and the second locking mechanism into the unlocked state.

6. The apparatus according to claim 1, wherein the first locking mechanism is an electromagnetic lock.

7. The apparatus according to claim 1, wherein the money comprises at least one of coins and bills.

8. The apparatus according to claim 1, wherein the accounting apparatus is a self checkout point of sale terminal.

9. An accounting apparatus operation method for the apparatus of claim 1, comprising:
   maintaining the first locking mechanism in the locked state in a normal mode in which accounting processing of driving the change machine to dispense change with respect to a price of a sales target is executed;
   shifting the first locking mechanism to the unlocked state in a specific mode based on an input of unlocking permission information for the locking mechanism;
   shifting a second locking mechanism between a locked state where the stocking unit is closed and an unlocked state where the stocking unit is openable;
   shifting the second locking mechanism to the unlocked state in the specific mode;
   shifting a third locking mechanism between a locked state where the stocking unit is closed and an unlocked state where the stocking unit is openable; and shifting the third locking mechanism to the unlocked state in the specific mode.

10. The method according to claim 9, further comprising:
displaying, on a display unit, a replenishment key for providing an instruction for replenishing the change machine with money from the stocking unit; and
bringing the first locking mechanism and the second locking mechanism into the unlocked state on a condition that the replenishment key is operated in the specific mode.

11. The method according to claim 10, further comprising:
detecting shortage of money in the change machine; and
displaying the replenishment key on a condition that of detection of the shortage of the money.

12. The method according to claim 11, further comprising:
transmitting display information indicating display of the replenishment key on a mobile information processing apparatus; and
bringing the first locking mechanism and the second locking mechanism into the unlocked state on a condition that operation information in accordance with an operation of the replenishment key displayed on the information processing apparatus in response to the transmission of the display information is received.

13. The apparatus according to claim 10, further comprising:
displaying, on the display unit, an unlocking key for providing an instruction for bringing the first locking mechanism and the second locking mechanism into the unlocked state.

14. The method according to claim 9, wherein the first locking mechanism is an electromagnetic lock.

15. The method according to claim 9, wherein the money comprises at least one of coins and bills.

16. The method according to claim 9, wherein the accounting apparatus is a self checkout point of sale terminal.

17. An accounting apparatus comprising:
a case body that accommodates a change machine for dispensing change and a stocking unit for stocking money to replenish the change machine;
a first door that is provided in the case body that is openable and closable and when closed provides an accommodation unit for accommodating the stocking unit;
a first locking mechanism that is shifted between a locked state where the first door is not openable and an unlocked state where the first door is openable;
an opening and closing control section that maintains the first locking mechanism in the locked state in a normal mode in which accounting processing of driving the change machine to dispense change with respect to a price of a sales target is executed, and enables the first locking mechanism to be shifted to the unlocked state in a specific mode based on an input of unlocking permission information for the locking mechanism;
a second door is provided in the case body that is openable and closable;
a second locking mechanism that is shifted between a locked state where the stocking unit is closed and an unlocked state where the stocking unit is openable, wherein the opening and closing control section enables the second locking mechanism to be shifted to the unlocked state in the specific mode; and
a third locking mechanism that is shifted between a locked state where the second door is closed and an unlocked state where the stocking unit is openable, wherein the opening and closing control section enables the third locking mechanism to be shifted to the unlocked state in the specific mode.

18. The apparatus according to claim 17, further comprising: a display unit; and a replenishment key display section that displays, on the display unit, a replenishment key for providing an instruction for replenishing the change machine with money from the stocking unit.

19. The apparatus according to claim 18, further comprising:
a detecting section that detects shortage of money in the change machine, wherein the replenishment key display section displays the replenishment key on a condition that the detection section detects the shortage of the money.

20. The apparatus according to claim 19, further comprising:
a transmission section that transmits display information indicating display of the replenishment key on a mobile information processing apparatus, wherein the opening and closing control section brings the first locking mechanism and the second locking mechanism into the unlocked state on a condition that operation information in accordance with an operation of the replenishment key displayed on the information processing apparatus in response to the transmission of the display information from the transmission section is received.

* * * * *